United States Patent
Chunduru et al.

(10) Patent No.: US 12,217,361 B1
(45) Date of Patent: Feb. 4, 2025

(54) APPARATUS AND METHOD FOR GENERATING A THREE-DIMENSIONAL (3D) MODEL OF CARDIAC ANATOMY BASED ON MODEL UNCERTAINTY

(71) Applicant: Anumana, Inc., Cambridge, MA (US)

(72) Inventors: Abhijith Chunduru, Bengaluru (IN); Uddeshya Upadhyay, Bengaluru (IN); Suthirth Vaidya, Bengaluru (IN); Sai Saketh Chennamsetty, Bengaluru (IN); Arjun Puranik, San Jose, CA (US)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 18/426,604

(22) Filed: Jan. 30, 2024

(51) Int. Cl.
*G06T 17/00* (2006.01)
*G06T 7/00* (2017.01)

(52) U.S. Cl.
CPC ............ *G06T 17/00* (2013.01); *G06T 7/0012* (2013.01); *G06T 2207/20084* (2013.01); *G06T 2207/30021* (2013.01)

(58) Field of Classification Search
None
See application file for complete search history.

(56) References Cited

U.S. PATENT DOCUMENTS

| | | | |
|---|---|---|---|
| 7,940,972 B2 | 5/2011 | Wildes et al. |
| 8,057,394 B2 | 11/2011 | Dala-Krishna |
| 8,428,690 B2 | 4/2013 | Li et al. |
| 9,179,890 B2 | 11/2015 | Ionasec et al. |
| 10,292,596 B2 | 5/2019 | Shadforth |
| 10,485,510 B2 | 11/2019 | Mansi et al. |
| 10,952,795 B2 | 3/2021 | Cohen et al. |

(Continued)

FOREIGN PATENT DOCUMENTS

| | | |
|---|---|---|
| CN | 111311737 B | 3/2023 |
| EP | 2338419 A1 | 6/2011 |

(Continued)

OTHER PUBLICATIONS

Electroanatomical mapping of the heart: basic concepts and implications for the treatment of cardiac arrhythmias, L Gepstein, SJ Evans; Jun. 2, 1998.

(Continued)

*Primary Examiner* — Aaron M Richer
(74) *Attorney, Agent, or Firm* — Caldwell Intellectual Property Law

(57) ABSTRACT

An apparatus and method for generating a three-dimensional (3D) model of cardiac anatomy including an overlay. The apparatus includes at least a processor configured receive a set of images of a cardiac anatomy pertaining to a subject, generate a set of shape parameters based on the set of images, wherein generating the set of shape parameters includes receiving cardiac geometry training data including a plurality of image sets as input correlated to a plurality of shape parameter sets as output, training a shape identification model using the cardiac geometry training data, and generating the set of shape parameters using the shape identification model, generate a 3D model of the cardiac anatomy based on the set of shape parameters, generate a map by determine a level of uncertainty at each location of a plurality of locations on the generated 3D model, and overlay the map onto the 3D model.

20 Claims, 12 Drawing Sheets

(56) References Cited

U.S. PATENT DOCUMENTS

| | | | |
|---|---|---|---|
| 11,217,000 B2 | 1/2022 | Dala-Krishna | |
| 11,534,136 B2 | 12/2022 | Funka-Lea et al. | |
| 11,806,189 B2 | 11/2023 | Funka-Lea et al. | |
| 2008/0285831 A1* | 11/2008 | Kirchberg | G06T 19/00 |
| | | | 382/131 |
| 2012/0165667 A1* | 6/2012 | Altmann | A61B 8/445 |
| | | | 600/463 |
| 2013/0231557 A1 | 9/2013 | Li et al. | |
| 2019/0090967 A1* | 3/2019 | Guthart | A61B 1/04 |
| 2019/0223819 A1 | 7/2019 | Mansi et al. | |
| 2019/0357987 A1 | 11/2019 | Harks et al. | |
| 2020/0289025 A1 | 9/2020 | Dichterman et al. | |
| 2021/0169394 A1 | 6/2021 | Chou et al. | |
| 2021/0217232 A1 | 7/2021 | Lupotti et al. | |
| 2022/0211314 A1* | 7/2022 | Govari | A61B 5/346 |
| 2022/0328195 A1 | 10/2022 | Mihalef et al. | |
| 2022/0370033 A1* | 11/2022 | Klingensmith | G06T 7/0012 |
| 2023/0284997 A1* | 9/2023 | Xia | A61B 6/542 |
| 2023/0342902 A1* | 10/2023 | Manafiazar | G06V 10/82 |
| 2024/0115242 A1* | 4/2024 | Jiang | A61B 8/463 |

FOREIGN PATENT DOCUMENTS

| | | |
|---|---|---|
| EP | 2824639 A3 | 4/2015 |
| JP | 5474342 B2 | 4/2014 |
| WO | 2021209287 A1 | 10/2021 |
| WO | 2023178252 A1 | 9/2023 |

OTHER PUBLICATIONS

Integration of 3-dimensional cardiac computed tomography images with real-time electroanatomic mapping to guide catheter ablation of atrial fibrillation. Mikaelian B.J, Malchano Z.J, Neuzil P, et al; Jul. 12, 2005.

Feasibility of artificial intelligence 3D algorithm integration with Intracardiac echocardiography for LA Imaging, Luigi Di Biase et al, Jul. 2023.

Lang; 3-Dimensional Echocardiography: Latest Developments and Future Directions Retrieved from: https://www.sciencedirect.com/science/article/pii/S1936878X18308301 Dec. 3, 2018.

Xu; Deep learning estimation of three dimensional left atrial shape from two chamber and four-chamber cardiac long axis views; Feb. 2023 https://www.ncbi.nlm.nih.gov/pmc/articles/PMC10125223/.

Merle; Music: Cardiac Imaging, Modelling and Visualisation Software for Diagnosis and Therapy; Jun. 16, 2022 Retrieved from: https://www.mdpi.com/2076-3417/12/12/6145.

Fanwei Kong et al; A deep-learning approach for direct whole-heart mesh reconstruction; Med Image Anal. Dec. 2021; 74: 102222. Published online Sep. 8, 2021.

Young-Ho Kim et al; Towards Automatic Manipulation of Intracardiac Echocardiography Catheter; IEEE Transaction On Medical Robotics and Bionics, Jul. 2020, REVIEW-ONLY.

* cited by examiner

APPARATUS AND METHOD FOR GENERATING A THREE-DIMENSIONAL (3D) MODEL OF CARDIAC ANATOMY BASED ON MODEL UNCERTAINTY

FIELD OF THE INVENTION

The present invention generally relates to the field of machine learning and medical imaging. In particular, the present invention is directed to a method for generating a three-dimensional (3D) model of cardiac anatomy.

BACKGROUND

A precise reconstruction of the left atrium, the pulmonary veins and the left atrial appendage is of critical importance in order to achieve efficient and safe results in atrial fibrillation ablation. Use of machine learning models to produce heart models, and training of such machine learning models, has not yet been optimized. Additionally, techniques for heart model generation often do not include display of model certainty or decision making based on model certainty.

SUMMARY OF THE DISCLOSURE

In an aspect, a method of generating a three-dimensional (3D) model of cardiac anatomy may include, using a cardiac image capture device, capturing a first set of images of cardiac anatomy; using at least a processor, generating a first 3D model of the cardiac anatomy as a function of the first set of images; using at least a processor, calculating a level of uncertainty at each location of a plurality of locations on the first 3D model; using the cardiac image capture device, capturing a second set of images of the cardiac anatomy corresponding to a high uncertainty region of the first 3D model; and using at least a processor, generating a second 3D model as a function of the second set of images.

In another aspect, a method of generating a three-dimensional (3D) model of cardiac anatomy may include, using a first cardiac image capture device, capturing a first set of images of cardiac anatomy; using at least a processor, generating a first 3D model of the cardiac anatomy as a function of the first set of images; using at least a processor, calculating a level of uncertainty at each location of a plurality of locations on the first 3D model; using a second cardiac image capture device, capturing a second set of images of the cardiac anatomy corresponding to a high uncertainty region of the first 3D model; and using at least a processor, generating a second 3D model as a function of the second set of images.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
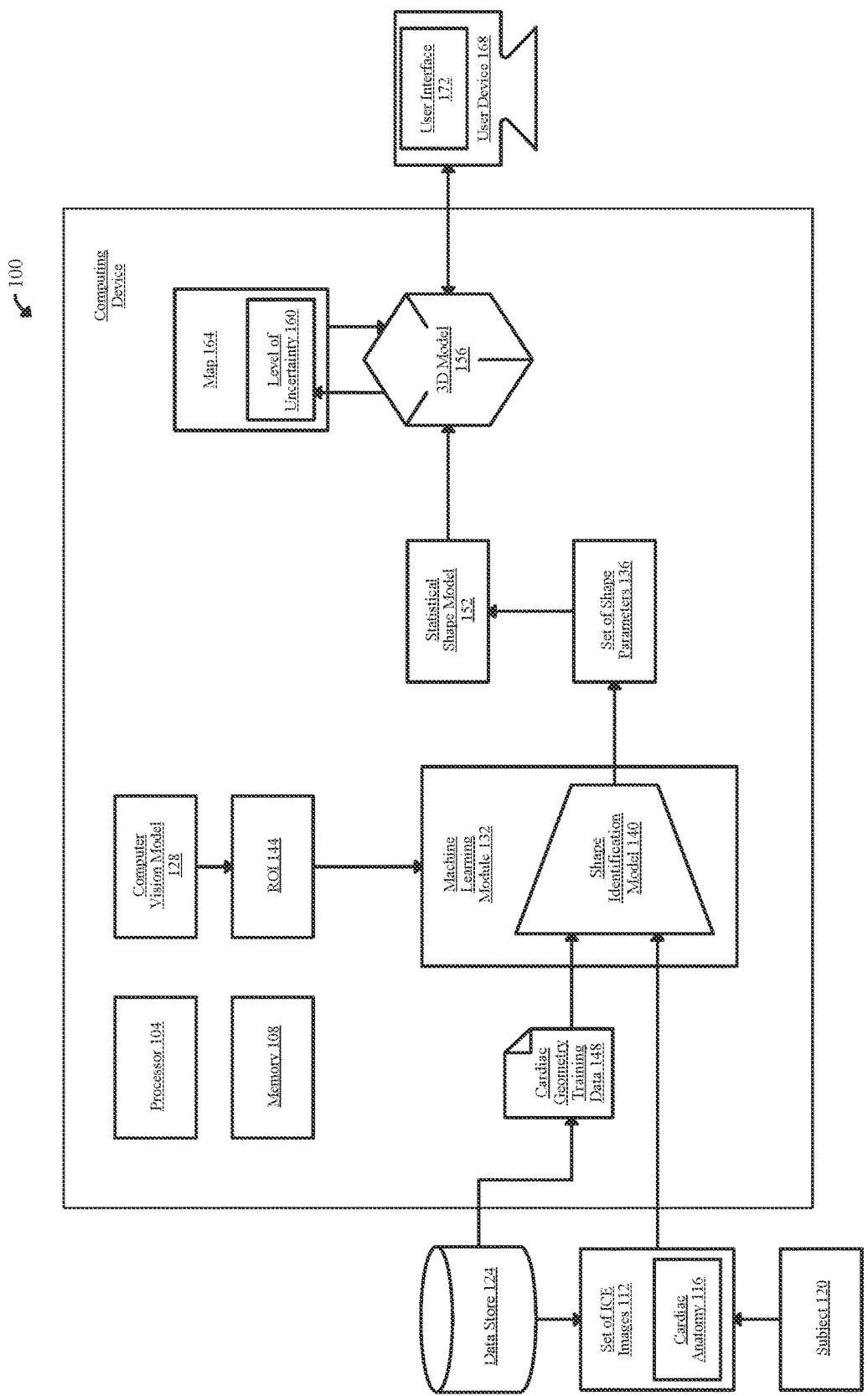
FIG. 1 is a block diagram of an exemplary embodiment of an apparatus for generating a three-dimensional (3D) model of cardiac anatomy via machine-learning.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, an apparatus and method for generating a three-dimensional (3d) model of cardiac anatomy with an overlay is disclosed. An overlay may include determining a level of uncertainty of outputs of models used, as described below, in regard to deciphering the geometric deposition of cardiac autonomy of a subject. In some cases, the level of uncertainty may be derived from variability within the distribution of shape parameters, image quality assessment, measurement errors and/or the like. The overly may be visualized on the heart model. In some cases, level of uncertainty may be color-coded, for example, a heat map may be overlaid on top of the heart model. In other cases, other visual cues e.g., symbols or indicators that alert user to areas of heart model that may require extra caution when used for planning or guidance during an ICE procedure.

Aspects of the present disclosure can be used to simplify the ultrasound assisted anatomy reconstruction system by using an AI based algorithm to learn the positioning and 3D reconstruction directly from the ultrasound images. This is so, at least in part, because apparatus is configured to implement AI-based learning from CT datasets. In an embodiment, neural networks based estimation removes the need for complicated systems, such as manual segmentation and reconstruction methods, specialized hardware, FAM, among others.

In one or more embodiments, apparatus and methods described herein may involve one or more aspects of precise reconstructing of the left atrium (LA), pulmonary veins (PV), and left atrial appendage (LAA) in atrial fibrillation (AF) ablation. "Atrial fibrillation (AF)," as described herein, is a cardiac arrhythmia characterized by irregular and often rapid heart rate. In some cases, AF may lead to various complications, including, without limitation, stroke, heart failure, and/or the like. "AF ablation," as described herein, is a procedure that aims to isolate and eliminate the abnormal electrical pathways causing the cardiac arrhythmia. LA, PV, and LAA are key structures involved in AF. In an embodiment, precise 3D reconstruction of LA, PV, and LAA may help in understanding their geometry and relationships which are essential for planning and/or executing AF ablation. In some cases, LA, PV, and LAA may be mapped in order to enable clinicians to identify one or more specific sites responsible for AF, allowing targeted ablation that minimizes damages to surrounding tissues. Additionally, or alternatively, apparatus and methods described herein may reduce the risk of complications such as, without limitation, perforation, stenosis, collateral damage, among others to adjacent structures. Apparatus and methods described herein may ensure ablation energy is delivered to the intended locations.

Referring now to FIG. 1, an exemplary embodiment of an apparatus 100 for generating 3D model of a cardiac anatomy via machine-learning is illustrated. System includes at least a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus includes a memory 108 communicatively connected to at least a processor 104, wherein the memory 108 contains instructions configuring at least a processor 104 to perform any processing steps described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a processor 104/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, processor is configured to receive a set of images 112 of a cardiac anatomy 116 pertaining to a subject 120. As used in this disclosure, a "set of images" refers to a collection or group of visual representations captured using an imaging modality, imaging technique, or both described herein. Set of images 112 may include, without limitation, two-dimensional images. In an embodiment, set of images 112 may include a set of intracardiac echocardiography (ICE) images, wherein the "set of ICE images" is a collection of ultrasound images obtained from within the heart's chambers or blood vessels. Processor 104 may receive set of images 112 from a cardiac image capture device. As used herein, a "cardiac image capture device" is a device capable of capturing a set of images of cardiac anatomy of a subject. A cardiac image capture device may include any device for capturing set of images 112 as described herein. For example, a cardiac image capture device may include an ICE catheter. In some cases, ICE images may be captured using a specialized catheter equipped with an ultrasound transducer that is inserted into the body and guided to the heart of subject 120. In an embodiment, set of images 112 may provide a detailed and real-time visualizations of cardiac anatomy. As used herein, "cardiac anatomy" is the structural composition of the heart and its associated blood vessels. Set of images 112 may also include internal structures, functions, and bold flow patterns of the heart of subject 120. Other exemplary embodiments of set of images 112 may include, without limitation, X-ray images, magnetic resonance imaging (MRI) scans, computed tomography (CT) scans, ultrasound images, optical images, digital photographs, or any other form of visual data. Additionally, images within set of images 112 may be related in terms of content, time of capture, sequence, or any other relevant parameters described herein. In a non-limiting example, each image of set of images 112 may represent a particular view, angle, or perspective of an object, subject, or scene, and may be in two-dimensional (2D) or 3D format.

Still referring to FIG. 1, images of set of images 112 may include, without limitation, any two-dimensional or three-dimensional images of any anatomy or anatomical structure, including without limitation images of any internal organ, tissue including without limitation muscular, connective tissue, epithelial tissue, and/or nervous tissue, bone, and/or any other element that may be imaged within a human and/or animal body. In a non-limiting example, cardiac anatomy 116 may include chambers (e.g., four chambers including left and right atria and left and right ventricles), valves (i.e., the structures that regulate blood flow between chambers and vessels, including mitral, tricuspid, aortic, and pulmonary valves), vessels (e.g., aorta, pulmonary arteries and veins, and coronary arteries), conduction system (i.e., a network of specialized cells that control the heart's electrical activity and rhythm), muscular and connective tissues (e.g., heart's muscular walls, septa, any other connective tissues that provide structural integrity and enable contraction), LAA and other appendages, pathological features (e.g., any abnormalities, defects, and/or the like), among others.

Still referring to FIG. 1, as used in this disclosure, a "subject" is an individual organism. In an embodiment, subject 120 may include a human, on whom or on which the procedure, study, or otherwise experiment, such as without limitation, AF ablation described herein, is being conducted. In some cases, subject 120 may include a provider of set of images 112 described herein. In other cases, subject 120 may include a recipient or a participant in a clinical trial or research study. In a non-limiting example, subject 120 may include a human patient with AF who is undergoing a procedure, an individual undergoing cardiac screening, a participant in a clinical trial, patient with congenital heart disease, heart transplant candidate, patient receiving follow-up care after cardiac surgery, healthy volunteer, patient with heart failure, or the like. Additionally, or alternatively, subject 120 may include an animal models (i.e., animal used to model AF such as a laboratory rat).

Still referring to FIG. 1, in an embodiment, each ICE image of set of ICE images may include a particular view of subject's 120 heart's chambers, valves, vessel, and/or the like. In a non-limiting example, set of images 112 may include multiple views e.g., different angles and perspectives of subject's 120 heart. In another embodiment, set of images 112 may be arranged in a temporal sequence. In a non-limiting example, set of images 112 may include a series of images captured over time, allowing for an observation of dynamic cardiac functions such as beating, blood flow, and/or the like. In some cases, each ICE image of set of images 112 may include a corresponding timestamp, wherein the timestamp may include an indicator showing a date and time of when the corresponding ICE image was taken.

Additionally, or alternatively, and still referring to FIG. 1, various imaging techniques or settings may be applied to set of images 112 that provide specific insights into cardiac anatomy 116. In some cases, cardiac anatomy 116 may include a plurality of physical characteristics, spatial relationships, and function aspects of the heart's component; for instance, and without limitation, receiving set of images 112 may include applying a doppler imaging technique, wherein the "doppler imaging technique" is a specialized ultrasound technique used to assess the movement of blood within the body, particularly within the heart and blood vessels. Processor 104 may configure a transducer to send high-frequency sound waves into the subject's 120 body, wherein the sound waves may bounce off moving blood cells and other structures. Reflected waves may then be picked up by the transducer and frequency of the reflected waves changes (Doppler shift) depending on the speed and direction of blood flow may be analyzed to determine one or more blood flow characteristics. In some cases, one or more ICE images within set of images 112 may include visual representations translated based on one or more blood flow characteristics. Such visual representations may be further color-coded, showing the speed and direction of blood flow. As an ordinary person skilled in the art, upon reviewing the entirety of this disclosure, will aware other exemplary modalities of ICE imaging such as, without limitation, computed tomography (CT) scans, magnetic resonance imaging MRI, positron emission tomography (PET) scan, angiography, electrocardiogram (ECG or EKG), single-photon emission computed tomography (SPECT), optical coherence tomography (OCT), thermography, tactile imaging, and/or the like.

With continued reference to FIG. 1, in one or more embodiments, receiving set of images 112 of cardiac anatomy 116 may include receiving a patient profile pertaining to subject 120. As used in this disclosure, a "patient profile" is a comprehensive collection of information related to an individual patient. In some cases, patient profile may include a variety of different types of data that, when combined, provide a detailed picture of a patient's overall health. In an embodiment, patient profile may include demographic data of patient, for example, and without limitation, patient profile may include basic information about the patient such as name, age, gender, ethnicity, socioeconomic status, and/or the like. In another embodiment, each patient profile may also include a patient's medical history, for example, and without limitation, patient profile may include a detailed record of the patient's past health conditions, medical procedures, hospitalizations, and illnesses such as surgeries, treatments, medications, and/or the like. In another embodiment, each patient profile may include lifestyle Information of patient, for example, and without limitation, patient profile may include details about the patient's diet, exercise habits, smoking and alcohol consumption, and other behaviors that could impact health. In a further embodiment, patient profile may include patient's family history, for example, and without limitation, patient profile may include a record of hereditary diseases. As an ordinary person skilled in the art, upon reviewing the entirety of this disclosure, will be aware of various type of data within patient profiles apparatus 100 may receive and process in consistent with this disclosure.

In a non-limiting example, and still referring to FIG. 1, patient profile may include one or more ICE images or set of images 112. Receiving set of images 112 may include extracting set of images 112 from patient profile (subsequent to patient identity verification and obtaining consent from subject 120). In some cases, patient profile of subject 120 may be obtained through hospital information system (HIS) or any other data acquisition platform to securely access patient's electronic medical record (EMR) or other relevant databases. Set of images 112 may be directly or indirectly downloaded or exported. In some cases, each ICE image of set of images 112 may be in a usable and/or computer-readable format such as, without limitation, DICOM format, and necessary metadata (e.g., patient information described above) may be included. Further, receiving set of images 112 may include recording the access and extraction of set of images 112; for instance, and without limitation, this process may be documented, by processor 104, in the patient's/subject's 120 medical record, databases, or other appropriate logs.

Further, and still referring to FIG. 1, in other embodiments, patient profile may include electrocardiogram (ECG) data. As used herein, "ECG data" is data related to an electrocardiogram of a patient that corresponds to the patient profile. An "electrocardiogram," as described herein, is a medical test that records the electrical activity of subject's heart over a period of time. In an embodiment, ECG data may include one or more recordings captured by a plurality of electrodes placed on patient's skin. In one or more embodiments, ECG data may include information regarding a P wave, T wave, QRS complex, PR interval, ST segment, and/or the like. Processor 104 may associate set of images 112 with ECG data, or in other cases, receiving set of images 112 may include receiving ECG data pertaining to subject 120 associated with set of images 112. Such ECG data may be collected simultaneously during ICE imaging. In some cases, set of images 112 may be linked with ECG data by one or more unique identifiers, such as without limitations, timestamps or other metadata described herein. In a non-limiting example, ECG data may be used to identify specific cardiac events or phases of the cardiac cycle, and the corresponding ICE images may be analyzed to see how heart's structure changes during those times.

With continued reference to FIG. 1, in other embodiments, receiving set of images 112 may include receiving set of ICE images from Data store 124. In some cases, Data store 124 may be implemented, without limitation, as a relational database, a key-value retrieval database such as a NOSQL database, or any other format or structure for use as a database that a person skilled in the art would recognize as suitable upon review of the entirety of this disclosure. Data store 124 may alternatively or additionally be implemented using a distributed data storage protocol and/or data structure, such as a distributed hash table or the like. Data store 124 may include a plurality of data entries and/or records as described above. Data entries in Data store 124 database may be flagged with or linked to one or more additional elements of information, which may be reflected in data entry cells and/or in linked tables such as tables related by one or more indices in Data store 124 or another relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

In a further embodiment, and still referring to FIG. 1, receiving set of images 112 may involve one or more image preprocessing steps. In some cases, processor 104 may be configured to calibrate one or more ICE images of set of images 112 by correct for distortions and ensure accurate spatial representation of cardiac anatomy 116 pertaining to subject 120. In a non-limiting example, processor 104 may select one or more reference objects within ICE image that needs calibration to correct spatial distortions. In some cases, processor 104 may be configured to place a phantom with pre-determined dimensions in such ICE image and adjust ICE image until the phantom's dimensions are accurately represented. In another non-limiting example, one or more ICE images' brightness and contrast may be adjusted, by processor 104 to ensure that echogenicity (reflectivity) of the tissues is accurately represented. One or more tissues with known echogenicity may be selected by processor 104 as reference tissues to adjust corresponding portions of the one or more ICE images. In other cases, standardized correction curves may be applied in or der to correct the echogenicity of ICE images. As an ordinary person skilled in the art, upon reviewing the entirety of this disclosure, may be aware of various calibration techniques, such as, without limitation, temporal calibration, geometric calibration, among others that can be used by processor 104 to preprocess set of images 112.

Additionally, or alternatively, and still referring to FIG. 1, receiving set of images 112 may include performing image segmentation on or more ICE images of set of images 112. In some cases, image segmentation may include separating specific structures or regions of interest (ROI) from the background or other structures in a given ICE image. In a non-limiting example, processor 104 may be configured to use edge detection algorithms to outline the heart chambers, separating them from surrounding tissues. One or more filters may be applied to highlight the boundaries between different types of tissues during the segmentation. In another non-limiting examples, valves and vessels may also be segmented by applying thresholding techniques. Processor 104 may be configured to set an intensity threshold based on the known echogenicity of blood and vessel walls and select pixels or regions having intensity below or above the intensity threshold from the given ICE image. In some cases, one or more machine learning models may be used to perform image segmentations, for example, and without limitation, a U-net (i.e., a convolution neural network containing a contracting path as an encoder and an expansive path as a decoder, wherein the encoder and the decoder forms a U-shaped structure).

Still referring to FIG. 1, in some embodiments, a process described herein may be performed in real time. For example, a processor may continuously receive images, and may perform one or more calculations as a function of those images while receiving additional images. In some embodiments, a processor may continuously receive images, and may determine a first set of images and a second set of images as a function of such continuous image stream. Processor may continuously receive images and update 3D models as a function of those images; for example, this may occur during a medical procedure. For example, images received first chronologically may be determined to be in first set of images, a calculation may be performed as a function of the first set of images, and while such calculations are ongoing, processor may receive additional images of continuous image stream, which may be determined to be in a second set of images, which may then be used to perform additional calculations. In some embodiments, a 3D model is generated and/or displayed to a user as images are captured and/or as calculations are performed. For example, a first set of images may be captured, a first 3D model may be generated as a function of such first set of images, and first 3D model may be displayed to a user as a second set of images is captured. In some embodiments, a first 3D model is generated, and a second set of images is received by a processor simultaneously.

With continued reference to FIG. 1, processor may be configured to generate a 3D data structure representing cardiac anatomy 116 as a function of set of images 112. In a non-limiting example, 3D data structure may include a 3D voxel occupancy representation (VOR). As used in this disclosure, a "3D voxel occupancy representation" of a cardiac anatomy is a 3D digital representation of a spatial structure of the cardiac anatomy, wherein the representation is composed of a plurality of discrete volumetric elements known as voxels. A "voxel," for the purpose of this disclosure, is a 3D equivalent of a pixel in 2D imaging. While a pixel represents a point in a 2D image and may include properties such as color and/or brightness, a voxel may represent a volume in a 3D space and may include additional properties such density/occupancy as described below. In an embodiment, each voxel of plurality of voxels within 3D VOR may represent a specific portion of cardiac anatomy 116. In some cases, voxel may be a smallest distinguishable box-shaped part (i.e., 1 px·1 px·1 px) of a three-dimensional image. In some cases, each voxel of plurality of voxels within VOR may be represented as a cube or rectangular prism (although other shapes may be used in specialized applications). Each voxel may include a size that determines a resolution of the 3D image or model. In an embodiment, smaller voxels may provide higher resolution; however, it may require more computational resources (e.g., RAM) for processor 104 to process.

In an embodiment, and still referring to FIG. 1, each voxel of plurality of voxels within VOR may include one or more embedded values. As used herein, "embedded values" refer to specific numerical or categorical data associated with each voxel. In some cases, embedded values may represent various attributes or characteristics of the corresponding portion of cardiac anatomy 116 that voxel represents. In a non-limiting example, embedded values may include density values, intensity values, texture information, or any other quantitative measures that provide insights into the underlying cardiac tissue. Such embedded values may be derived from set of ICE images or other imaging modalities used to generate data structure. In some cases, embedded values may be utilized, by processor 104, to differentiate between different types of cardiac tissues, such as myocardial tissue, blood vessels, or chambers. Embedded values may also facilitate the visualization of dynamic cardiac functions, for example, and without limitation, blood flow or heart beating by encoding temporal information such as timestamps within plurality of voxels.

Still referring to FIG. 1, in an embodiment, each voxel of plurality of voxels may include a presence indicator. As used in this disclosure, a "presence indicator" refers to a data element that indicates a presence or absence of cardiac tissue within that portion. In some cases, and without limitation, presence indicator may include an occupancy status as one of the embedded values described herein. Portion may include a specific location within 3D space where data structure is generated; for instance, and without limitation, a coordinate in 3D space represented in a tuple such as (x, y, z). In an embodiment, 3D VOR may provide a spatial framework that allows for the modeling and visualization of cardiac anatomy 116 in 3D space. In some cases, 3D data structure may include a plurality of layers or slices (either horizontal [e.g., xy plane] or vertical [e.g., xz or yz plane depends on the view direction]), wherein each layer or slices of the plurality of layers or slices is corresponding to a different cross-sectional view of subject's 120 heart, and collectively forming a comprehensive 3D depiction of the cardiac structure. In a non-limiting example, 3D VOR having plurality of voxels with presence indicators may indicate whether each voxel in 3D space may be occupied by a part of subject's 120 heart. A binary value such as 0 or 1 may be configured as presence indicator to show either a pixel of 3D space is occupied (e.g., 1) or empty (e.g., 0). In should be noted that other values may be used as presence indicator such as a Boolean value e.g., TRUE or FALSE.

In some cases, and still reference to FIG. 1, one or more embedded values, such as, without limitations, occupancy, or density, may be derived from set of images 112 described herein by processor 104. In a non-limiting example, determining occupancy status of each voxel of plurality of voxels may include converting set of ICE images to a set of binary images and determining occupancy status of each voxel as a function of the structure of interest's binary value. In some cases, occupancy status may include a value representing the likelihood of occupancy of the corresponding heart tissue. In another non-limiting example, density may be calculated, by processor 104, for each voxel as a function of the echogenicity of one or more pixels on a given ICE image, wherein, the brightness of the given ICE image may be analyzed since different tissues reflect ultrasound waves differently.

With continued reference to FIG. 1, generating 3D data structure of cardiac anatomy 116 may include generating a 3D array. In some cases, processor 104 may divide 3D space into a grid of plurality of voxels, each with specific x, y, and z coordinates as embedded values. Each element of 3D array may correspond to a voxel. In some cases, 3D array may allow for easy access and manipulation of plurality of voxels, enabling various analyses, visualizations, and transformations either described or not described herein. In a non-limiting example, embedded values may include a density of the tissue at a specific location of a patient's body derived from one or more ICE images of set of images 112.

Additionally, or alternatively, and still referring to FIG. 1, a 3D data structure of cardiac anatomy 116 may include a 3D grid configured to map presence indicators and/or other embedded values described herein of plurality of voxels (e.g., tissue density, blood flow velocity, echogenicity or acoustic properties, and any other biophysical properties). As used in this disclosure, a "3D grid" is a 3D data structure that divides a given volume into a plurality of discrete units. Such a volume may include, for example, a volume of a heart. Such discrete units may be referred to as cells (i.e., volume elements). In an embodiment, each cell within 3D grid may be associated with a distinct voxel. Mapping presence indicators or other embedded values may include assigning each presence indicator or embedded value to each points within 3D grid such as corners of each corresponding cell. Such values may be derived from set of images 112 as described above.

In yet another embodiment, and still referring to FIG. 1, cells may be continuous, meaning that one or more cells may represent one or more continuous regions of space rather than discrete, separate units. In a non-limiting example, instead of being uniform, mapped presence indicator and/or other embedded values may vary continuously across different cells or cell's volume. In such embodiment, processor 104 may use interpolation to estimate other (unknown) embedded values within a range based on existing values such as known embedded values at specific points, thereby allowing for smooth transitions between cells. Exemplary interpolation methods may include, without limitation, linear interpolation, cubic interpolation, and/or the like. For example, and without limitation, if the corners of a cell have known values interpolation can be used to estimate the values at any point within the cell based on those corner values.

In a non-limiting example, and still referring to FIG. 1, 3D data structure of cardiac anatomy 116 may include a 3D grid having a plurality of cells e.g., voxels, wherein each cell may contain a continuous range of values representing tissue density, blood flow velocity, or other properties (i.e., embedded values). Processor 104 may be configured to apply trilinear or tricubic interpolation to estimate tissue density within each cell based on presence indicator or other known values at the cell's boundaries, since tissue densities change gradually; Such 3D grid may provide a smooth, continuous representation of heat's internal structures, allowing for more nuanced analysis and visualization as described below. In a further embodiment, 3D grid with continuous cells may be additionally used in fluid dynamics simulations.

With continued reference to FIG. 1, in some cases, presence indicators and/or other embedded values may be mapped to 3D grid as a function of array masking, wherein specific array or grid may be selected to modify based on one or more pre-defined criteria. In a non-limiting example, processor 104 may generate a mask e.g., a binary array that defines which voxels or cells are affected. Mask may be used to select or modify specific voxels or cells based on certain attributes; for instance, and without limitation, processor 104 may use mask to isolate the LA within the heart focusing the analysis on that specific region. Such mask may include a criteria defined by specific density thresholds that distinguish the LA's tissue (i.e., voxels representing LA in 3D grid) from surrounding structures (i.e., neighboring voxels). In some cases, such mask may further include a binary mask, wherein each voxel in the 3D grid may be assigned a first presence indicator such as 1 if the voxel meets the criteria for the LA and a second presence indicator such as 0 if it does not. In some embodiments, mask may be directly applied to 3D grid, selecting, or modifying voxels or cells, thereby enabling processor 104 to highlight, exclude, or otherwise manipulate specific parts of cardiac anatomy 115 within 3D grid. Processor 104 may then perform an element-wise multiplication between 3D grid and the mask. Continuing from the previous non-limiting example, voxels corresponding to the LA (wherein the mask value is 1) may retain their original values, while other voxels (where the mask value is 0) may be set to 0 or other specific value (i.e., excluded or masked out).

With continued reference to FIG. 1, in some embodiments, 3D grid may include one or more spatial features extracted from set of images 112 of cardiac anatomy 116. As used in this disclosure, a "spatial feature" is a specific characteristic or attribute related to the spatial arrangement, shape, size, texture, or orientation of one or more structures within a 3D space. In some cases, spatial features may include one or more embedded values described herein and their combinations thereof. In a non-limiting example, spatial feature may be represented numerically as a vector, a metric or other mathematical constructs that capture specific spatial characteristics. In some cases, spatial features may also be visualized as contours, surfaces, or other geometric representations. In an embodiment, spatial features may be extracted using edge detection, texture analysis, or other image processing techniques (e.g., cleaning and enhancing images, image segmentation, and/or the like). In another embodiment, one or more machine learning models, such as convolutional neural networks (CNNs) as described in further detail below, may be used to extract complex spatial features.

Still referring to FIG. 1, as used in this disclosure, a "vector" is a data structure that represents one or more a quantitative values, measures of one or more spatial features, or both. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes.

Still referring to FIG. 1, in a non-limiting example, one or more spatial features may include one or more shape features (i.e., characteristics related to the shape of specific cardiac structures), such as curvature, surface area, volume, and/or the like. In another non-limiting example, one or more spatial features may include one or more texture features (i.e., characteristics related to the texture or pattern within cardiac tissues, as seen set of images 112), such as gray-level co-occurrence matrix (GLCM) features representing the texture of heart muscle tissue. In another non-limiting example, one or more spatial features may include one or more orientation features (i.e., characteristics related to the orientation or alignment of cardiac structures), such as the angle or alignment of the septum within the heart. In a further non-limiting example, one or more spatial features may include one or more edge and boundary features (i.e., Characteristics related to the edges or boundaries between different cardiac structures or tissues), such as edge detection features highlighting the boundary between the myocardium and the cardiac chambers. As an ordinary person skilled in the art, upon reviewing the entirety of this disclosure, will be aware of various spatial features extracted from set of images 112 in consistent with this disclosure.

With continued reference to FIG. 1, in some embodiments, apparatus 100 may include a computer vision model 128 configured to generate 3D data structure of cardiac anatomy 116 by implementing image segmentation methods as described further below. A "computer vision model," for the purpose of this disclosure, is a computation model designed to interpret and make determinations based on visual data. In an embodiment, computer vision model 128 may process set of images 112, to make a determination about a scene, space, and/or object in cardiac anatomy 116. In a non-limiting example, computer vision model 128 may be used for registration of plurality of voxels within a 3D space. In some cases, registration may include image processing described herein, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient an ICE image relative to a 3D coordinate system; exemplary transformations include without limitation homography transforms and affine transforms. In an embodiment, registration of ICE image to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto the ICE image; however, a third dimension of registration, representing depth and/or a z axis, may be detected by utilizing depth-sensing techniques such as Doppler imaging. Alternatively, the third dimension may be inferred from the known geometry and orientation of the imaging device (e.g., ICE catheter), or through the application of one or more machine learning models trained to interpret depth from the two-dimensional projection.

With continued reference to FIG. 1, processor 104 may use a machine learning module 132 to implement one or more algorithms or generate one or more machine learning models, such as a cardiac anatomy modeling model to generate data structure of cardiac anatomy 116. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. In a further embodiment, training data may include previous outputs such that one or more machine learning models iteratively produces outputs.

Still referring to FIG. 1, machine learning module 132 may be used to generate cardiac anatomy modeling model and/or any other machine learning models, such as, shape identification model as described in further detail below, using training data. Cardiac anatomy modeling model may be trained by correlated inputs and outputs of training data. Training data may be data sets that have already been converted from raw data whether manually, by machine, or any other method. In an embodiment, generating data structure of cardiac anatomy 116 includes receiving cardiac anatomy training data, wherein the cardiac anatomy training data may include a plurality of image sets as input and a plurality of computed tomography (CT) based cardiac anatomy models as output, and wherein each image set of plurality of image sets may include any images described in this disclosure. In some cases, cardiac anatomy training data may be received from Data store 124 or other databases. In other cases, cardiac anatomy training data may be collected by a data acquisition unit from external sources such as one or more medical equipment's e.g., imaging devices or diagnostic tools, wherein the data acquisition may be configured as an intermediary between the data source and machine learning module 132.

Still referring to FIG. 1, a computed tomography (CT) scan may be used to generate a cardiac anatomy model. As used herein, a "computed tomography based cardiac anatomy model" is a 3D representation of the heart and surrounding structures that is created using data from CT scans. Computed Tomography is a medical imaging technique that uses X-rays to capture cross-sectional images (slices) of the body. By taking a plurality of slices, a CT scan creates a detailed 3D representation of the internal structure. In an embodiment, CT-based cardiac anatomy model may include 3D representations of the heart including chambers, valves, blood vessels, and surrounding tissues. In some cases, CT-based cardiac anatomy model may be interactive; for instance, medical professionals may rotate, zoom, and/or explore CT-based cardiac anatomy model from various angles. In some cases, plurality of CT-based cardiac anatomy models may be generated prior to the training of the cardiac anatomy modeling model. Plurality of CT-based cardiac anatomy models may be generated using existing techniques in the field as described above such as, without limitation, FAM, cardiac CT merging, among others. In a non-limiting example, plurality of CT-based cardiac anatomy models may provide ground through or references models against cardiac anatomy modeling model that is being trained. In a non-limiting example, generating data structure of cardiac anatomy 116 further includes training cardiac anatomy modeling model using cardiac anatomy training data described herein. Cardiac anatomy modeling model trained using cardiac anatomy training data may be able to interpret ICE images by learning relationships between ICE images and corresponding CT-based cardiac anatomy models. Processor 104 is further configured to generate data structure of cardiac anatomy 116 as a function of set of images 112 using trained cardiac anatomy modeling model. In some cases, data structure e.g., 3D model 156 as described below may be interpreted, visualized, and analyzed by processor 104 in similar manner to CT-based cardiac anatomy models, wherein both are 3D structures that correspond to ICE images.

With continued reference to FIG. 1, in an embodiment, cardiac anatomy modeling model comprises a deep neural network (DNN). As used in this disclosure, a "deep neural network" is defined as a neural network with two or more hidden layers. Neural network is described in further detail below with reference to FIGS. 4-5. In a non-limiting example, cardiac anatomy modeling model may include a convolutional neural network (CNN). Generating 3D data structure of cardiac anatomy 116 may include training CNN using cardiac anatomy training data and generating 3D data structure as a function of set of images 112 using trained CNN. A "convolutional neural network," for the purpose of this disclosure, is a neural network in which at least one hidden layer is a convolutional layer that convolves inputs to that layer with a subset of inputs known as a "kernel," along with one or more additional layers such as pooling layers, fully connected layers, and the like. In some cases, CNN may include, without limitation, a deep neural network (DNN) extension. Mathematical (or convolution) operations performed in the convolutional layer may include convolution of two or more functions, where the kernel may be applied to input data e.g., set of images 112 through a sliding window approach. In some cases, convolution operations may enable processor 104 to detect local/global patterns, edges, textures, and any other spatial features described herein within each ICE image of set of images 112. Spatial features may be passed through one or more activation functions, such as without limitation, Rectified Linear Unit (ReLU), to introduce non-linearities into the processing step of generating 3D data structure of cardiac anatomy 116. Additionally, or alternatively, CNN may also include one or more pooling layers, wherein each pooling layer is configured to reduce the dimensionality of input data while preserving essential features within the input data. In a non-limiting example, CNN may include one or more pooling layer configured to reduce the spatial dimensions of spatial feature maps by applying downsampling, such as max-pooling or average pooling, to small, non-overlapping regions of one or more spatial features.

Still referring to FIG. 1, CNN may further include one or more fully connected layers configured to combine spatial features extracted by the convolutional and pooling layers as described above. In some cases, one or more fully connected layers may allow for higher-level pattern recognition. In a non-limiting example, one or more fully connected layers may connect every neuron (i.e., node) in its input to every neuron in its output, functioning as a traditional feedforward neural network layer. In some cases, one or more fully connected layers may be used at the end of CNN to perform high-level reasoning and produce the final output such as, without limitation, a 3D data structure of cardiac anatomy 116. Further, each fully connected layer may be followed by one or more dropout layers configured to prevent overfitting, and one or more normalization layers to stabilize the learning process described herein.

With continued reference to FIG. 1, CNN may further include a 3D CNN, wherein the 3D CNN, unlike standard 2D CNN, may include utilization of one or more 3D convolutions which allow them to directly process 3D data, thereby enabling processor 104 to generate 3D structures such as 3D data structure of cardiac anatomy 116 using the 3D CNN. In a non-limiting example, 3D CNN may include one or more 3D filters (i.e., kernels) that move through the set of images 112 in three dimensions and capturing spatial relationships in x, y, and z axis. Similar to 3D convolutions, 3D CNN may further include one or more 3D pooling layers that may be used to reduce the dimensionality of ICE images while preserving spatial features as described above. Additionally, or alternatively, an encoder-decoder structure may be implemented (extended to 3D), by processor 104, in 3D CNN, wherein the encoder-decoder structure includes an encoding path that captures the context and a decoding path that enables precise localization in a same manner as U-net as described above. Such encoder-decoder structures may also include a plurality of skip connections, allowing 3D CNN to use information from multiple resolutions to improve the process of generating 3D data structure of cardiac anatomy 116.

With continued reference to FIG. 1, in an embodiment, training the cardiac anatomy modeling model (i.e., CNN) may include selecting a suitable loss function to guide the training process. In a non-limiting example, a loss function that measures the difference between the predicted 3D VORs and the ground truth 3D structure e.g., CT-based cardiac anatomy models may be used, such as, without limitation, mean squared error (MSE) or a custom loss function may be designed for one or more embodiments described herein. Additionally, or alternatively, optimization algorithms, such as stochastic gradient descent (SGD), may then be used to adjust the cardiac anatomy modeling model's parameters to minimize such loss. In a further non-limiting embodiment, instead of directly predicting 3D data structure, cardiac anatomy modeling model may be trained as a regression model to predict presence indicators and/or other embedded values described herein for each voxel of plurality of voxels within a 3D grid. Additionally, CNN may be extended with additional deep learning techniques, such as recurrent neural networks (RNNs) or attention mechanism, to capture additional features and/or data relationships within input data. These extensions may further enhance the accuracy and robustness of the cardiac anatomy modeling.

With continued reference to FIG. 1, processor 104 is configured to generate a set of shape parameters 160 based on set of images 112. As used in this disclosure, a "set of shape parameters" is a collection of numerical values or descriptors that quantitatively represent the geometric or morphological characteristics of a structure e.g., a heart. In a non-limiting example, set of shape parameters 136 may include information and/or metadata calculated, determined, and/or extracted from set of ICE images, such as, dimensions, angles, curvatures, surface areas, texture, symmetry, and/or the like. In other embodiments, processor 104 may be configured to parameterize features (e.g., edges, textures, contours, and any other characteristics that describe the shape cardiac anatomy 116) extracted from set of images 112 using CNN described herein. Such parameterization may involve processor 104 to derive one or more shape parameters including one or more morphological descriptors that quantitatively describe cardiac anatomy 116 based on extracted features. In some cases, processor 104 may be configured to use principal component analysis (PCA) to reduce the dimensionality of set of shape parameters 136, allowing processor 104 to focusing on the most informative shape parameters of set of shape parameters 136 in further processing steps described below.

With continued reference to FIG. 1, in a non-limiting example, set of shape parameters 136 may be generated based on set of images 112 using a machine learning model such as, without limitation, shape identification model 140. Generating set of shape parameters 136 may include receiving cardiac geometry training data 148. Cardiac geometry training data 148 may include a plurality of image sets as input correlated with a plurality of shape parameter sets as output. In some cases, cardiac geometry training data may be received from Data store 124 described herein. For example, and without limitation, cardiac geometry training data 148 may include a plurality of ICE images, correlated with shape parameter sets generated using CT scan data. In some embodiments, cardiac geometry training data 148 may include data as to a position and/or orientation one or more ICE images were taken in within a heart. Additionally, cardiac geometry training data 148 may include previous input image sets and their corresponding shape parameters output. Shape identification model 140 may be iterative such that outputs may be used as future inputs of shape identification model 140. This may allow shape identification model 140 to evolve. Processor 104 may be further configured to generate set of shape parameters 136 as a function of set of images 112 using trained shape identification model 140. Shape identification model 140 may include a neural network, such as a deep neural network and/or a convolutional neural network, as described herein.

Still referring to FIG. 1, generating set of shape parameters 136 may include performing image processing/segmentation techniques, as described above, prior to implementation of shape identification model 140 in order to optimize performance and runtime of processor 104 and training of model. For example, image segmentation may include normalization and standardization methods performed by computer vision model 128 to ensure that pixel values in images 112 are normalized or standardized to a consistent scale thus aiding convergence during training of shape identification model 140. Image segmentation may include data augmentation techniques such as rotation, scaling, flipping, and translation to artificially increase the size of the training dataset and improve model generalization. Image segmentation may include image enhancement preprocessing techniques like histogram equalization or contrast stretching to enhance relevant features in the images. Image segmentation may include texture and shape descriptors to extract features beyond pixel values, such as texture and shape descriptors, to capture additional information about cardiac structures. Image segmentation may include architecture selection methods, as in experiments with different architectures, such as U-Net, DeepLab, or custom architectures, depending on the complexity and characteristics of the cardiac images. Image segmentation may include grid Search or random Search processing methods to systematically explore hyperparameter combinations to find the optimal configuration for a 3D model. As previously disclosed, image segmentation may include separating specific structures or regions of interest 144 (ROI) from the background or other structures in a given ICE image, wherein a collection of ROIs 144 may be also incorporated by the shape parameter training data/cardiac geometry training data 148.

With continued reference to FIG. 1, processor 104 may use a statistical shape model (SSM) to generate and/or iteratively refine a 3D model 156 based on a set of shape parameters. As used herein, a "heart model" is a 3D representation of cardiac anatomy. In some cases, 3D model 156 may be generated through a direct 3D reconstruction from a series of (2D) ICE images. In a non-limiting example, set of images 112 may include a plurality of ICE images captured from different angles and positions within the heart. Processor 104 may be configured to apply one or more 3D reconstruction algorithms, such as without limitation, marching cubes, contour detection and segmentation, active contour models, and/or the like to create a coherent 3D representation e.g., 3D model 156 of cardiac anatomy 116. In some cases, such direct 3D reconstruction may leverage the inherent spatial information within set of images 112, providing a direct and intuitive way to model the 3D model 156 of the heart's structure. In a further embodiment, generic 3D modeling techniques may be applied to create the initial 3D model. In some cases, generic 3D modeling techniques may include surface modeling, solid modeling, or parametric modeling, among others. As an ordinary person skilled in the art, upon reviewing the entirety of this disclosure, will be aware of various 3D reconstruction algorithms that may be used by processor 104 to generate 3D model 156 of cardiac anatomy 116.

Still referring to FIG. 1, in some embodiments, a statistical shape model (SSM) may be used to generate 3D model 156. As used herein, a "statistical shape model" is a data structure including a mathematical model of a heart shape, generated from a plurality of training data heart shapes. A SSM may take into account variation in the heart shape according to one or more characteristics of a subject. In some cases, SSM may be constructed by analyzing one or more datasets of shapes and identifying, for example, mean shapes and main modes of variation within the one or more datasets. In a non-limiting example, SSM may start with calculation of at least one mean shape, which represents an average geometry of all the heart shapes in a given dataset, wherein the at least one mean shape may serve as a central reference point for processor 104 to understand different variations. In some cases, dataset may include, without limitation, cardiac anatomy training data, cardiac geometry training data 148, CT scan data, and/or any datasets within ICE image databases described herein. In some embodiments, historical CT scan data, such as CT scan data obtained from a database of historical subject data, may be used.

Still referring to FIG. 1, SSM may identify one or more principal modes of variation within a dataset. As used herein, "principal modes of variation," are main patterns or directions along which data points vary within dataset. In a non-limiting example, identifying principal modes of variation may include applying principal component analysis (PCA) to given dataset. An SSM may be used to create, for example, an average heart shape; such average shape may include an average shape of a heart across an entire data set of scanned hearts. Changes in one or more parameters of SSM may allow 3D model 156 to be determined according to changes from an average along a principal mode of variation. In some embodiments, such parameters may influence which subpopulations of training shapes are considered when determining 3D model 156 and/or a relative influence of such subpopulations of training shapes in determining 3D model 156. For example, parameters may be adjusted such that an average heart of a 35 year old subject is determined. In another example, parameters may be adjusted such that an average heart of a male subject may be determined. In some embodiments, weights may be applied to training data shapes and/or categories of training data shapes in order to generate an average shape of a subject with particular characteristics. Non-limiting examples of subject characteristics which may be customized to a subject when determining a SSM include age, gender, height, and weight. In some embodiments, one or more statistical constraints (e.g., mean, variance, correlation, boundary, proportion constraint and/or the like) may be introduced into SSM 152 based on the distribution of shape parameters within plurality of shape parameter sets.

With continued reference to FIG. 1, in some cases, once modes of variation are extracted, processor 104 may be configured to create a shape representation for any given heart shape within the studied class. In a non-limiting example, 3D model 156 having a shape S may be mathematically represented as $$S = \bar{S} + \sum_{k=1}^{M} a_k \times \phi_k,$$

wherein $\bar{S}$ denotes the mean shape derived from the set of example shapes, M is the number of modes of variation considered, $a_k$ are the coefficients or weights for each mode, and $\phi_k$ are the modes of variation (eigenvectors corresponding to the kth principal component). In some cases, coefficients $a_k$ may dictate a degree to which each mode of variation is present in shape S. In some cases, coefficients $a_k$ may vary from positive to negative (or negative to positive) based on the deformation of the 3D model 156 in directions described by each mode of variation. In some cases, 3D model 156 may include mean shape as described herein. In some cases, 3D model 156 may include a predictive heart shape that may not have been explicitly seen in the set of example shapes or patient's heart observations. In some cases, 3D model 156 may be in 3D VOR as described above.

Still referring to FIG. 1, generating the 3D model 156 may include transforming 3D model 156 to a second heart model as a function of a plurality of mode changers within SSM 152, wherein each mode changer of the plurality of mode changers is associated with a model feature of heart model. As used in this disclosure, a "mode changer" is an algorithmic component derived from PCA configured to encapsulate a specific mode of variation. A mode changer may represent a distinct way in which the shape of 3D model 156 may deviate from the mean shape. A "model feature," for the purpose of this disclosure, is a distinct, recognizable and quantifiable attribute or characteristic of the heart model. For example, and without limitation, model feature may include an anatomical feature such as the size and curvature of the ventricles, the thickness of the heart wall, the positioning of heart valves or the like. In some cases, model feature may correspond to at least one shape parameter as described herein. In a non-limiting example, a mode changer may be associated with the size variation of the left ventricle identified within heart model. Such mode changer may be adjusted to modify the volume of the left ventricle, resulting in a second heart model that mimics potential biological variations or specific patient conditions that is different from original heart model. In some cases, multiple mode changers of SSM 152 may be adjusted simultaneously. For example, and without limitation, the rigid registration might involve translations and rotations to superimpose the shapes; affine registration could incorporate scaling, shearing, and other linear transformations; while non-rigid methods might employ B-splines, thin-plate splines, or diffeomorphic transformations to flexibly map one shape onto another. In some cases, an averaged position of each corresponding point (or voxel) across all example shapes may be calculated using formula $$\bar{p}_i = \frac{1}{N} \sum_{j=1}^{N} p_{ji},$$

where $\bar{p}_i$ is the mean position of the ith point (or voxel), $p_{ji}$ is the position of the ith point in the jth example shape, and N is the total number of example shapes in the labeled set. In some cases, principle component analysis (PCA) may be applied to the aligned shapes to extract at least a primary mode of variation. As described herein, a "primary mode of variation" is a mode of variation that has the most significant variability. As used herein, a "mode of variation" is a specific pattern or direction of a shape change. In some cases, such significancy may be indicated by the first principal component in PCA. In some cases, a plurality of modes of variation may be extracted, wherein each mode (or principal component) may represent a specific way the shape of heart may be deformed from the mean shape, determined by one or more eigenvectors of the covariance matrix of the aligned shapes. In a non-limiting example, eigenvector with the highest eigenvalue may represent primary mode of variation which captures the largest amount of shape variability within example shapes, while subsequent modes (eigenvectors) capture decreasing amounts of variability. In a non-limiting example, SSM 152 described herein may be consistent with any SSM disclosed in U.S. patent application Ser. No. 18/376,688, filed on Oct. 4, 2023, and entitled "APPARATUS AND METHODS FOR GENERATING A THREE-DIMENSIONAL (3D) MODEL OF CARDIAC ANATOMY VIA MACHINE-LEARNING," which its entirety is incorporated herein by reference.

Still referring to FIG. 1, in some embodiments, SSM may be used to refine a mesh produced using a 3D model estimate. For example, a machine learning model such as a deep neural network may be used to produce a voxel grid estimate of cardiac anatomy based on ICE frames of the cardiac anatomy, and SSM may be used to refine this estimate to produce a 3D mesh of cardiac anatomy. In some embodiments, this may include deforming a template of cardiac anatomy to arrive at a most probable shape that matches a DNN estimate. Additionally, or alternatively, a machine learning model may be trained to directly generate parameters of a statistical shape model.

Still referring to FIG. 1, additionally, processor 104 may use user feedback to train the machine-learning models described above. For example, cardiac anatomy modeling model and/or shape identification model 140 may be trained using past inputs and outputs of cardiac anatomy modeling model and/or shape identification model 140. In some embodiments, if user feedback indicates that a subsequent 3D model outputted by SSM 152 was "bad," then that output and the corresponding input e.g., set of ICE images, corresponding CT-based cardiac anatomy model may be removed from training data used to train cardiac anatomy modeling model and/or shape identification model 140, and/or may be replaced with a value entered by, e.g., another user that represents an ideal 3D model of the heart given the input the machine learning models originally received, permitting use in retraining, and adding to training data as described above; in either case, machine learning models described herein may be retrained with modified training data. In some embodiments, training data such as cardiac anatomy training data and/or cardiac geometry training data 148 may include user feedback. Further, apparatus 100 may be configured to validate one or more machine learning models described herein against real-world data, identifying areas where machine learning models may be underperforming or misaligned with clinical needs. Such feedback may also be used to guide model training, ensuring that machine learning models are not only accurate but also clinically meaningful and aligned with healthcare or medical professional's needs and priorities.

Still referring to FIG. 1, generating 3D model 156 includes determining a level of uncertainty 160 at least at one location of a plurality of locations of the 3D model 156 based on the set of shape parameters 136. A location may refer to each voxel of plurality of voxels, cells, geometric marker, and all other identifying markers/data points of a model as described throughout this disclosure. A plurality of locations may refer to the surface of heart model, such as a set of pixels or a region on a model. "Uncertainty," as used herein, refers to the lack of confidence or precision in a model's predictions. In some cases, the level of uncertainty 160 may be derived from variability within the distribution of shape parameters, image quality assessment, measurement errors and/or the like. In a non-limiting example, greater changes in heart geometry (indicated by the plurality of shape parameters) may correspond to a greater level of uncertainty at that location. This may be used to inform clinical decisions, for example, areas of high uncertainty may be avoided when planning a pathway for surgical intervention or additional imaging may be requested to reduce uncertainty in critical areas.

Still referring to FIG. 1, levels of uncertainty may refer to categories of uncertainty such as epistemic uncertainty, aleatoric uncertainty, model parameter uncertainty, pixel-wise uncertainty, boundary uncertainty, uncertainty in time series data, predictive uncertainty, systematic uncertainty, model output uncertainty, and the like. Epistemic uncertainty arises from a lack of knowledge or information. For example, limited training data for certain cardiac pathologies may contribute to higher epistemic uncertainty. Aleatoric uncertainty, also known as data uncertainty, results from inherent randomness or variability in the data. For example, variability in cardiac anatomy among different patients or imaging modalities introduces aleatoric uncertainty. Model Parameter Uncertainty is uncertainty associated with the model parameters, indicating how well the model has learned the underlying patterns in the training data. For example, variations in model parameters due to the stochastic nature of the optimization process contribute to parameter uncertainty. Pixel-wise Uncertainty is associated with individual pixels in the image. It provides a confidence measure for each pixel in the segmentation mask. For example, certain regions of the heart may be more challenging to segment accurately, leading to higher pixel-wise uncertainty. Boundary Uncertainty is related to the boundaries between different structures or regions in the image. For example, the precise delineation of the endocardium or epicardium may be uncertain in regions where the boundaries are not well-defined. Regarding uncertainty in Time Series Data, in tasks involving sequential data, such as cardiac imaging over time, uncertainty can be related to variations in the temporal dimension. For example, segmentation of dynamic structures like the beating heart involves handling uncertainty associated with different phases of the cardiac cycle. Predictive Uncertainty is uncertainty in the model's predictions for unseen data points. For example, when the model encounters a novel pathology or an atypical cardiac structure, predictive uncertainty measures its confidence in providing accurate segmentation. Systematic Uncertainty is uncertainty stemming from systematic errors or biases in the data collection process or the model architecture. For example, if the training data is biased towards a specific demographic, the model may exhibit uncertainty when applied to a more diverse patient population. Model Output Uncertainty is uncertainty associated with the actual output of the model, indicating how confident the model is in its segmentation predictions. For example, the model may output a segmentation mask with a probability or confidence score for each pixel, reflecting the uncertainty associated with that pixel's classification.

Still referring to FIG. 1, a level of uncertainty 160 may include a degree, statistical measure, percentage, or variable whether linguistic or numerical, and the like identifying a range of uncertainty. For example, processor 104 may generate probability scores/confidence scores for locations of a model, indicating the model's confidence in its predictions. Calibration plots can be used to assess how well these confidence scores align with the true accuracy. Processor 104 may perform a threshold analysis to investigate how varying decision thresholds for classification or segmentation affects the trade-off between sensitivity and specificity in uncertain regions. Threshold analysis may include task-specific metrics for clinical relevance. For example, in cardiac image segmentation, critical regions like the myocardium may have stricter uncertainty thresholds compared to less critical regions. Processor 104 may implement Bayesian Neural Networks (BNNs) to perform posterior predictive checks to evaluate the agreement between the model's predictions and the observed data, such as data store 124, considering the uncertainty represented by the posterior distribution in Bayesian frameworks. In various embodiments, a level of uncertainty 160 may be metrics determined by processor 104, such as Pixel-wise Uncertainty Metrics, Boundary Displacement Error (BDE), Uncertainty-Aware Loss Functions, Calibration Metrics, and the like.

Still referring to FIG. 1, in some embodiments, level of uncertainty 160 may be determined using Monte Carlo dropout. Monte Carlo dropout may include running a neural network multiple times using different dropout configurations. Each dropout configuration may include turning off turning off one or more nodes of a neural network. Monte Carlo dropout may be used to, for example, determine mean and variance parameters. In some embodiments, such a variance parameter may be used as level of uncertainty 160.

Still referring to FIG. 1, in some embodiments, level of uncertainty 160 may be determined using deep ensembles. A deep ensemble may include a plurality of machine learning models. An input may be applied to a plurality of machine learning model, and their outputs may be combined. For example, an average and/or variance of outputs of a plurality of models may be found. Level of uncertainty 160 may be determined based on such variance.

Still referring to FIG. 1, shape identification model 140 may be calibrated. Calibration may include fine-tuning or adjusting shape identification model 140 predictions to align more closely with the actual probabilities. A well-calibrated model is one where, for instance, if it predicts a 70% probability for a certain event, that event actually occurs about 70% of the time. Calibrating shape identification model 140 may include receiving a set of validation data. As used in the current disclosure, a "set of validation data" is a set of data used to calibrate a machine learning model, which the machine learning model has not been trained on. A set of validation data is used to assess the model's performance and, in this case, to calibrate level of uncertainty 160. Processor 104 may sort each datapoint of the validation set into a plurality of hyperfine bins as a function of a continuous value. As used in the current disclosure, "hyperfine bins" is a grouping of the data points into a set of very fine or detailed bins. These bins may be organized based on the values of the continuous value. Each bin corresponds to a specific range or interval of continuous values. Processor 104 may additionally determine a bin-wise scaling factor for each of the plurality of hyperfine bins. As used in the current disclosure, "bin-wise scaling factors" refers to a factor or multiplier associated with each individual hyperfine bin. It may be used to adjust or scale the data within each bin. The scaling factor can be unique to each bin and is typically determined based on some specific criteria or algorithm.

Still referring to FIG. 1, calibration of level of uncertainty 160 may include temperature scaling. Temperature scaling may include adjusting confidence scores or probabilities generated by a model to make them better reflect the true uncertainty or reliability of the model's predictions. This technique is often used to improve the calibration of deep neural networks, especially in cases where model confidence scores do not align well with actual probabilities. Temperature scaling introduces a hyperparameter known as the "temperature" (T). The temperature is a positive scalar value that is applied to the logits (raw scores) before they are passed through a SoftMax function. By adjusting the temperature, processor 104 may control the sharpness or spread of the probability distribution. A higher temperature makes the distribution more uniform, while a lower temperature makes the distribution sharper. In an embodiment, high temperature may smooth the distribution, reducing confidence in predictions. High temperature may increase level of uncertainty 160. Low temperature may sharpen the distribution, reducing level of uncertainty 160. Temperature parameter may be adjusted based on a validation dataset. A temperature that minimizes the difference between predicted probabilities and the true probabilities observed in a calibration dataset may be determined.

Still referring to FIG. 1, in some embodiments, processor 104 may identify a high uncertainty location of 3D model 156. As used herein, a "high uncertainty location" is a location of a 3D model associated with a level of uncertainty that is above the average level of uncertainty of the 3D model. A high uncertainty location may be determined using a method for determining uncertainty as described above. In a non-limiting example, a high uncertainty location may be determined using model output uncertainty. In some embodiments, a high uncertainty location may be identified on a map as described below. In some embodiments, a high uncertainty location may be determined using a method of determining a level of uncertainty used to generate a map as described below. In some embodiments, a high uncertainty location has higher level of uncertainty than 10%, 20%, 30%, 40%, 50%, 60%, 70%, 80%, 90%, or 100% of locations of a 3D model.

Still Referring to FIG. 1, processor 104 is configured to generate a map 164 regarding one or more levels of uncertainty. A "map," as used herein, refers to a visualization. Map 164 may include level(s) of uncertainty to be visualized on heart model. Map 164 may include a color-coded heatmap, including other visual cues, symbols or indicators that alert a user to areas of 3D model 156 that may require extra caution when used for planning or guidance during an ICE procedure. For example, after obtaining the segmentation results from heart model, map 164 may be generated. Map 164 may highlight the uncertainty or confidence level associated with each pixel in the segmentation. Assigning colors to different intensity levels in map 164 allows for an intuitive visualization. Typically, warmer colors (e.g., red, or yellow) might represent high uncertainty, while cooler colors (e.g., blue, or green) could indicate low uncertainty. The colorcoding can be adjusted based on specific thresholds or clinical requirements. In some embodiments, a map may include and/or identify one or more high uncertainty locations. For example, a high uncertainty location may be represented in a color such as red, orange, or yellow. In some embodiments, a mathematical formula may be used to generate colors based on uncertainty level. For example, a formula May convert high uncertainty values into hex values or RGB values associated with warmer colors and low uncertainty values into hex values or RGB values associated with cooler colors. Warm colors and cool colors need not be used to represent high and low uncertainty, respectively. For example, any first color and/or degree of opacity may represent high uncertainty, and any second color and/or degree of opacity may represent low transparency. For example, an opaque blue may be used to represent high uncertainty, and a moderately transparent yellow may be used to represent low uncertainty. In some embodiments, colors used may be those on a gradient from a first color to a second color. In some embodiments, only a single color may be used, such as when one of high or low uncertainty is represented by transparency. In some embodiments, more than two colors and/pr opacities may be used to represent uncertainty values. For example, a first gradient may be used to represent uncertainty values in a first range, and a second gradient may be used to represent uncertainty values in a second range. In some embodiments, discrete colors are used for certain uncertainty ranges. In some embodiments, uncertainty values may be represented along a continuous range of color and/or opacity. In some embodiments, non-color features may be used to represent uncertainty values. In non-limiting examples, a particular pattern may be applied to an uncertain region, brightness or darkness may be used, and line width and dot size may be used.

Still referring to FIG. 1, in some embodiments, visual representations used for uncertainty may be relative to one or more other points within that model. For example, the lowest uncertainty point may always be green, and the highest uncertainty point may always be red. This may allow a user to understand which points are the most or least uncertain, even when all points are relatively certain or uncertain. In some embodiments, a first visual representation of uncertainty may be used for absolute uncertainty, and a second visual representation of uncertainty may be used for relative uncertainty. For example, opacity may be used to represent relative uncertainty within a model, and color may be used to represent absolute uncertainty.

Still referring to FIG. 1, in some embodiments, mathematical formula for converting the uncertainty values to colors may be recalculated and/or updated as a function of the upper and lower uncertainty values. For example, the mathematical formula may be updated such that the lowest uncertainty value represents one end of the color/opacity spectrum and the highest uncertainty value represents the other end of the color/opacity spectrum.

Still referring to FIG. 1, generating map 164 may include methods such as Class Activation Mapping (CAM). Class Activation Mapping is a technique that originated for image classification tasks and has been extended to provide visual insights into the regions of an image that are most important for a particular class. CAM allows the visualization of the spatial attention of a convolutional neural network (CNN) by generating heat maps that highlight discriminative regions. CAM may be applied to the last convolutional layer of a CNN. The features extracted by this layer capture high-level semantic information, making it suitable for visualizing the importance of different regions in an image. CAM is typically applied to the last convolutional layer of a CNN. The features extracted by this layer capture high-level semantic information, making it suitable for visualizing the importance of different regions in an image. The output of the global average pooling is then fed into a fully connected layer with a softmax activation function. This converts the features into class scores, indicating the likelihood of the image belonging to different classes. The CAM algorithm computes a weighted sum of the original feature maps based on the weights of the fully connected layer. These weights are determined during the training process and represent the importance of each feature map for a specific class. The weighted sum is applied to the original feature maps, producing a single heat map. This heat map highlights the regions of the input image that contributed most to the prediction for the target class. The generated heat map can be overlaid on the input image, visually indicating which regions are most relevant for the predicted class. Typically, warmer colors (e.g., red, or yellow) represent higher activation or importance.

Still Referring to FIG. 1, generating map 164 may include Grad-CAM (Gradient-weighted Class Activation Mapping). Grad-CAM is an extension of Class Activation Mapping (CAM) that enhances the localization capabilities by incorporating gradient information from the final convolutional layer of a neural network. Grad-CAM helps to generate heat maps that highlight discriminative regions in an image, providing more fine-grained insights into where a convolutional neural network (CNN) is focusing its attention when making predictions. In traditional CAM, the last convolutional layer's feature maps are linearly combined to obtain a weighted sum, and the resulting weights are used to create a heat map that highlights relevant regions for a specific class. Grad-CAM improves upon CAM by introducing gradient information. It computes the gradients of the predicted class score with respect to the feature maps of the last convolutional layer. Grad-CAM retains the global average pooling (GAP) operation applied after the last convolutional layer, as it is an integral part of CAM. The GAP operation condenses the spatial information into a single value per feature map. The gradients obtained in the previous step are used to calculate the importance of each feature map. These gradients represent the importance of each feature map in contributing to the final prediction. A weighted sum is computed using these gradients, and this is combined with the original feature maps. The computed sum goes through a ReLU activation function, discarding any negative values. This step emphasizes positive contributions and suppresses negative ones. The ReLU-activated weighted sum is linearly combined with the original feature maps to produce a weighted combination. This combination retains spatial information and helps create a more accurate heat map. The resulting heat map is often normalized to enhance visualization, ensuring that the values are within a specific range (e.g., between 0 and 1). The final heat map generated by Grad-CAM is then overlaid on the input image, highlighting the regions of interest for the predicted class. The intensity of the heat map indicates the importance of different regions. Grad-CAM enhances the interpretability and explainability of deep learning models, allowing practitioners and researchers to understand which parts of an image are crucial for a particular prediction. This is particularly valuable in applications such as medical imaging or any domain where understanding the decision-making process is critical.

Still Referring to FIG. 1, generating map 164 may include utilizing a "SmoothGrad technique," a technique designed to improve the interpretability of neural network predictions by reducing the noise in the attribution maps or heat maps generated by visualizing gradients. It is particularly useful for understanding the decision-making process of deep learning models, especially in scenarios where the explanations need to be robust and less sensitive to input perturbations. The primary goal of SmoothGrad is to enhance the visual quality of attribution maps generated by visualizing gradients. Attribution maps highlight the regions in the input that contribute most to a model's prediction. SmoothGrad aims to reduce the impact of noise in these maps, providing more stable and interpretable visualizations. The key idea behind SmoothGrad is to introduce perturbations to the input data. Instead of attributing the prediction solely to the gradients calculated with respect to the original input, the gradients are averaged over multiple perturbed versions of the input. By averaging the gradients over multiple perturbed samples, SmoothGrad helps reduce the impact of noise or irrelevant features in the attribution maps. This is particularly beneficial when dealing with complex or noisy datasets. Perturbation techniques include adding Gaussian noise, random rotations, or random translations to the input data. These perturbations create variations in the input while preserving the essential features, leading to more stable and reliable attribution maps. For each perturbed input, gradients are calculated with respect to the model's output. These gradients are then averaged over all perturbed samples. This process smoothens the attribution map by reducing the influence of random noise. The averaged gradients may undergo normalization or scaling to ensure that the values are interpretable and within a specific range. This step can enhance the consistency and comparability of the generated attribution maps. The final step involves generating a heat map using the smoothed gradients. The heat map represents the attribution of different regions in the input to the model's prediction, providing a clearer and more stable visualization.

Still Referring to FIG. 1, generating map 164 may include implementing one or more Gaussian Processes. A Gaussian Process is a collection of random variables, any finite subset of which has a joint Gaussian distribution. In simpler terms, it's a distribution over functions rather than a distribution over finite-dimensional vectors. Gaussian Processes (GPs) can be applied to generate heat maps in various ways, particularly in the context of regression tasks where one would want to predict continuous values across a spatial domain. Given a set of observed data points, the GP can predict the values at unobserved locations in the spatial domain. Importantly, it also provides uncertainty estimates associated with these predictions. This uncertainty can be visualized as a heat map. The predicted values from the GP represent the main heat map, indicating the expected values across the spatial domain. The uncertainty associated with each prediction can be visualized as an uncertainty heat map. This uncertainty heat map provides insights into regions where the model is less confident about its predictions. Overlay of the main heat map and the uncertainty heat map on the original spatial data may create a composite visualization. Warmer colors in the main heat map might represent higher predicted values, while the uncertainty heat map's intensity could indicate regions where the model's predictions are less certain.

Still referring to FIG. 1, uncertainty may be depicted in ways other than a color coded heatmap. For example, a 2-dimensional cross section of a 3D model may be taken, and a third dimension indicating certainty or uncertainty may be added. In another example, transparency may indicate certainty or uncertainty. In another example, sharpness may indicate certainty or uncertainty. In another example, size of dots or thickness of lines making up a 3D model may indicate certainty or uncertainty. In some embodiments, locations with particular certainty features may be identified. For example, high uncertainty location may be included and/or identified.

Still referring to FIG. 1, processor 104 is configured to overlay map 164 onto heart model. In some embodiments, the overlay may be placed on 3D model 156 and go through a refinement process as described above. Overlaying map 164 on a model may include implementing spatial alignment methods, texture mapping techniques wherein the color information from the heat map is mapped onto the vertices or faces of the 3D model, shader programs that define how the heat map values influence the final appearance of the 3D model, visualization software or programming libraries that support 3D rendering and overlay capabilities, interactivity visualization, quality control methods, and the like. For example, texture mapping may include UV Mapping wherein each point on the surface of a 3D model is associated with a set of texture coordinates often denoted as U and V. These coordinates are analogous to the X and Y coordinates on a 2D image. UV mapping establishes the correspondence between points on the 3D model and pixels on the 2D texture. In another example, interactive visualization may create visual representations of data that users can interact with and manipulate. This approach allows users to explore and analyze data dynamically, gaining insights through direct engagement with the visual representation. For example, mouse interactivity may allow users to interact with visual elements using mouse actions, such as hovering over data points for additional information, clicking to drill down into details, or dragging to pan and zoom. Filtering and Selection capabilities may allow a user to filter data based on specific criteria or select subsets of data for closer examination. This is particularly useful when dealing with large datasets. Spatial Exploration may allow users to zoom in to explore details or pan to navigate across the space.

Still referring to FIG. 1. in some cases, an ICE frame taken during an ICE procedure or synthesized for machine learning training purposes may be also overlaid at a corresponding location or heart model. Overlaying the ICE frame may include registering the ICE frame to the generated 3D model 156 using the image processing model. This process and method may use a processing system, including at least a processor, image generator, and camera transformation program, as disclosed in U.S. patent application Ser. No. 18, 18/509,520, filed on Nov. 15, 2023, entitled "APPARATUS AND METHODS FOR SYNTHETIZING MEDICAL IMAGES," the entirety of which is incorporated herein by reference. For example, the processing system may include at least a processor and a memory communicatively connected to the at least a processor, wherein the memory contains instructions configuring the at least a processor to receive a heart model related to a patient's heart, identify a region of interest within the heart model, wherein identifying the region of interest includes locating at least a point of view on the heart model and determining a view angle corresponding to the at least a view origin, wherein the at least a point of view and the corresponding view angle define at least one field of view that include at least a portion of the heart model. The at least a processor may be further configured to generate at least a medical image as a function of the region of interest using an image generator, wherein the at least a medical image captures an anatomical structure of the at least a portion of the heart model.

Still referring to FIG. 1, in some embodiments, processor 104 may receive more than one set of images of cardiac anatomy. For example, processor 104 may receive a first set of images of cardiac anatomy, and such first image may be used to perform one or more functions described herein. As examples, a 3D model, a level of uncertainty, and/or a map may be generated based on such first set of images. A second set of images may be captured as a function of such a 3D model, level of uncertainty, and/or map. In some embodiments, a second set of images may be captured of one or more high uncertainty locations.

Still referring to FIG. 1, image sets beyond the first may be captured and/or received as described above with respect to set of images 112. A second set of images may be captured as a function of a high uncertainty location. For example, a first set of images may be used to determine a first 3D model, and a map including a high uncertainty location may be overlaid on the first 3D model. Such first 3D model and map may be displayed to a user, such as through a display device. A user, such as a medical professional, may use a cardiac image capture device to capture a second set of images based on the 3D model and map. For example, a user may use a cardiac image capture device to capture a second set of images of a high uncertainty location.

Still referring to FIG. 1, image sets beyond the first may be used to create a 3D model and/or a map. In some embodiments, a second set of images may be captured, and the second set of images may be used to generate a 3D model and/or a map as described herein. In some embodiments, a second set of images may be combined with an earlier captured first set of images to generate a 3D model and/or a map. For example, a first set of images may provide data as to a majority of a cardiac anatomy, but a 3D model based on a first set of images may include one or more high uncertainty locations; a second set of images providing additional data on one or more high uncertainty locations may be captured by a user using a cardiac image capture device, and the first set of images and second set of images may be combined to provide more complete cardiac anatomy data. A second 3D model and/or a second map may be generated based on the first set of images and the second set of images. In some embodiments, a second 3D model may be generated using a filtered set of first and second images, as disclosed in this disclosure. In some embodiments, processor may continuously update second 3D model as further images are collected. Updating second 3D model may include any of the methods for generating a 3D model as disclosed in this disclosure. Processor may be configured to update a 3D after every set time period. Set time period may include 1 second, 5 seconds, 10 seconds, 1 minute, and the like. Set time period may range from 10 ms to 5 minutes. Processor may be configured to update a 3D model after a certain number of additional images have been collected. For example processor may update 3D model after 20 additional images have been collected. For example processor may update 3D model after 10 additional images have been collected. For example processor may update 3D model after 50 additional images have been collected. For example processor may update 3D model after 100 or more additional images have been collected.

Still referring to FIG. 1, in some embodiments, a second set of images may be captured based on first set of images. For example, if levels of uncertainty of a 3D model are sufficiently high, then processor 104 may configure a display device to display a notification to a user indicating that a second set of images is to be captured. In another example, if levels of uncertainty of a 3D model are sufficiently high, then a user may capture a second set of images. In some embodiments, processor 104 may automatically trigger capture of a second set of images and/or repositioning of a cardiac image capture device. In some embodiments, this may occur based on a level of uncertainty of a 3D model. For example, processor 104 may automatically reposition a cardiac image capture device into a location and orientation for capturing an image of a part of cardiac anatomy 116 associated with a high uncertainty location of 3D model 156. This may occur, for example, if a level of uncertainty exceeds a threshold. Non-limiting metrics which may be used to determine information displayed to a user and/or automatically capture a second set of images include a maximum uncertainty, an average uncertainty, a median uncertainty, a level of uncertainty at a certain uncertainty percentile, and the like. Such metrics may be compared to thresholds to determine information displayed to a user and/or automatically capture a second set of images.

Still referring to FIG. 1, in some embodiments, processor 104 may remove and/or filter out one or more frames of one of more sets of images such that a 3D model is generated based on a subset of the sets of images. In some embodiments, one or more images may be filtered out such that a subset of a set of images contains a desired number of images. For example, desired number of images may be equal to a bandwidth of a neural network/. In some embodiments, images may be selected to be filtered out such that images remaining in a subset of a set of images are sufficiently diverse. For example, a set of images may include many frames captured depicting a first feature, and only a single frame (or fewer frames) of additional features. In this example, a frame selected to be filtered out may include a frame depicting the first feature. In some embodiments, one or more frames which are identical or nearly identical to one or more additional frames may be filtered out. In some embodiments, processor 104 may remove an image of first set of images from the first set of images. In some embodiments, processor 104 may add one or more additional frames to a set of images such that a 3D model is generated based on a larger set of images. In some embodiments, one or more images of a set of images may be duplicated in order to arrive at a desired number of images in a set of images. In some embodiments, processor 104 may duplicate an image of first set of images and add the duplicate to the first set of images. In some embodiments, a first set of images and a second set of images may have been received by processor 104, and processor 104 may generate a 3D model as a function of one or more images of the first set of images and one or more images of the second set of images. For example, processor 104 may determine a combined set of images, may perform an image filtration step and/or an image duplication step as described above on the combined set of images, and may generate a 3D model as a function of a resulting set of images. In some embodiments, image filtration may use a machine vision module. In some embodiments, a desired number of images may include a number of images which satisfies input requirements of a machine learning model or other algorithm. In some embodiments, a machine learning model or other algorithm may accept as an input a limited number of frames in order to, for example, avoid excessive use of processing power. In some embodiment, processor may filter first and/or second set of images to include 128 images. In some embodiments, this filtering step may be performed on any available images (such as a combination of the first and second set of images, along with any set collected thereafter).

With continued reference to FIG. 1, apparatus 100 may further include a display device 168. As used in this disclosure, a "display device" is an electronic device that visually presents information to a user. In an embodiment, display device may include an output interface that translates data such as, without limitation, subsequent 3D heart model from processor 104 or other computing devices into a visual form that can be easily understood by user. In some cases, subsequent 3D heart model/or other data described herein such as, without limitation, ICE images, 3D VOR, shape parameters initial model and/or template model may also be displayed through display device 168 using a user interface 172. User interface 172 may include a graphical user interface (GUI), wherein the GUI may include a window in which subsequent 3D heart model and/or other data described herein may be displayed. In an embodiment, user interface 172 may include one or more graphical locator and/or cursor facilities allowing user to interact with subsequent 3D heart model and/or any other data, or even process described herein; for instance, and without limitation, by using a touchscreen, touchpad, mouse, keyboard, and/or other manual data entry device, user may enter user input containing selecting specific regions, adding comments, adjusting parameter, and/or the like. In a non-limiting example, user interface 172 may include one or more menus and/or panels permitting selection of measurements, models, visualization of data/model to be displayed and/or used, elements of data, functions, or other aspects of data/model to be edited, added, and/or manipulated, options for importation of and/or linking to application programmer interfaces (APIs), exterior services, data source, machine-learning models, and/or algorithms, or the like. Persons skilled in the art, upon reviewing the entirety of this disclosure, will be aware of various ways in which a visual interface and/or elements thereof may be implemented and/or used as described in this disclosure.

One or more systems, methods, or devices herein may be consistent with any system, method, or device disclosed in U.S. patent application Ser. No. 18/395,087, filed on Dec. 22, 2023, and titled "APPARATUS AND METHOD FOR GENERATING A THREE-DIMENSIONAL (3D) MODEL OF CARDIAC ANATOMY WITH AN OVERLAY," the entirety of which is hereby incorporated by reference.

Figure 2:
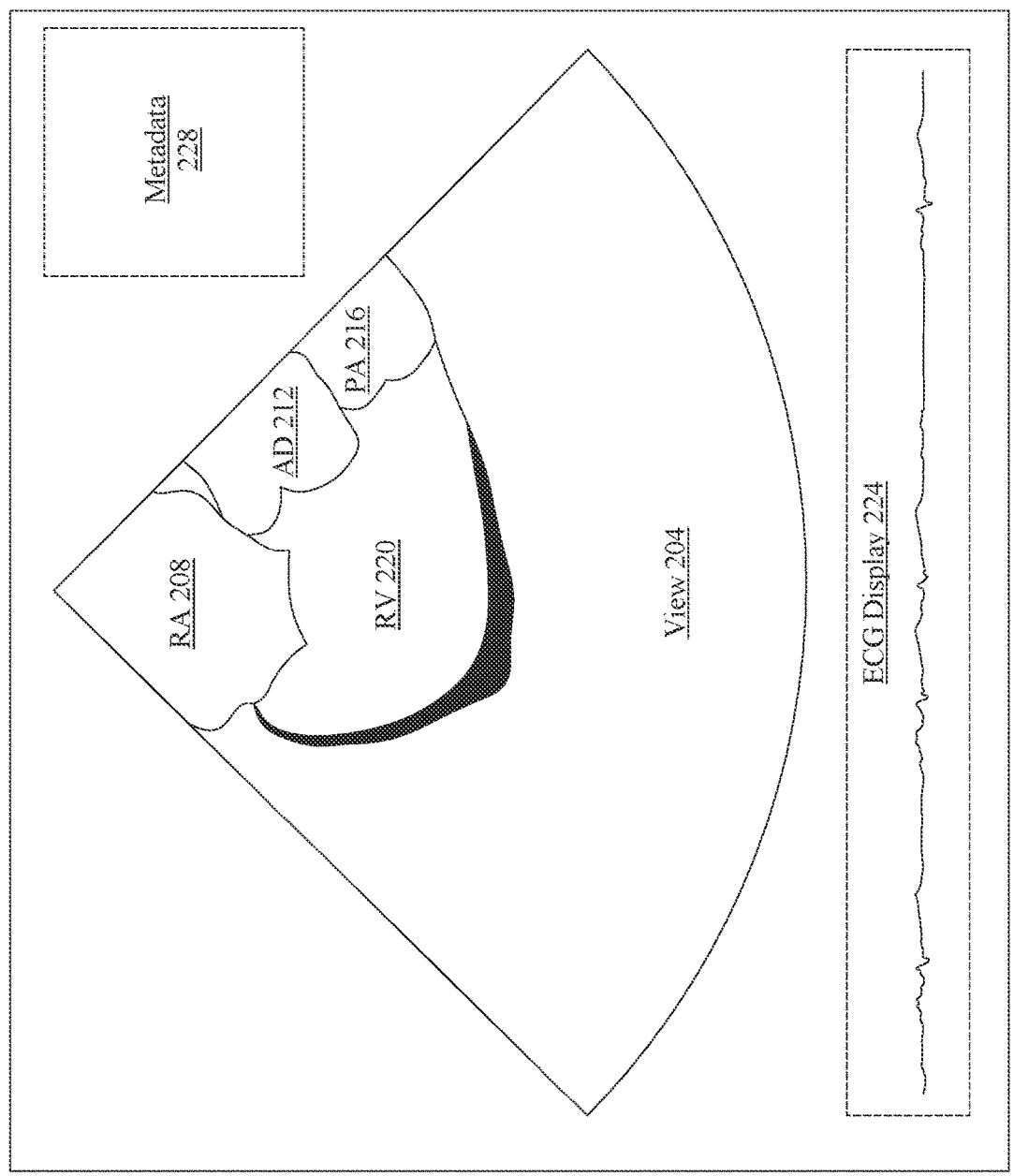
FIG. 2 shows an exemplary embodiment of an intracardiac echocardiography (ICE) image.

Now referring to FIG. 2, an exemplary embodiment of an ICE image 200 is illustrated. As described above with reference to FIG. 1, set of images 112 may include a plurality of ICE images, wherein each ICE image of the plurality of ICE images is a specialized form of echocardiography that may provide detailed image of heart's (i.e., cardiac anatomy 116) interior structures. In a non-limiting example, plurality of ICE images may include an ICE video (e.g., plurality of ICE images arranged in a corresponding time sequence). In an embodiment, ICE image 200 may be real-time, dynamic ultrasound image that provide a (detailed) view 204 of heart's interior structures, including, without limitation, right atrium (RA) 208, anterior descending (AD) 212, pulmonary atresia (PA) 216, and right ventricular (RV) 220.

With continued reference to FIG. 2, in some cases, ICE image 200 may include gray scaled image. It should be noted that, in some cases, ICE image 200 may be configured to visualize blood flow and/or blood flow patterns within the heart via color doppler as described above with FIG. 1. In some cases, resolution and/or clarity of ICE image 200 as described herein may be superior to transthoracic or transesophageal echocardiography due to the ICE catheter may be positioned inside the heart, closer to the structures being imaged.

Still referring to FIG. 2, in a non-limiting example, heart chambers 208 may appear as dark, anechoic (black) areas since they are filled with blood, which doesn't reflect ultrasound waves well. Heart walls, valves, and/or other structures may appear as varying shades of gray, depending on their density and composition, in some cases, Color Doppler overlays may show blood flow in different colors, indicating the direction and speed of blood flow. For instance, and without limitation, red may indicate flow towards the probe, while blue may indicate flow away from the probe.

With continued reference to FIG. 2, in a non-limiting embodiment, ICE image 200 may be synchronized with ECG data as described above with reference to FIG. 1, allowing for precise timing of cardiac events with anatomical visualization provided by ICE. In some cases, ICE image 200 may include a ECG display 224 configured to display ECG waveform as a continuous line graph at the top, bottom, or side of ICE image 200. In some cases, specific parts of the cardiac cycle e.g., systole or diastole, may be correlated with visual data from ICE image 200.

Additionally, or alternatively, and still referring to FIG. 2, ICE image 200 may come with accompanying metadata 228 displayed on the side or corners of ICE image 200 as described herein. In some cases, metadata 228 may provide essential contextual information about ICE image 200 and/or the corresponding patient. In a non-limiting example, metadata 228 may include patient information (e.g., patient ID, name, DOB, age, gender, and the like), image acquisition details (e.g., date and time, probe type, frequency, depth, gain, and the like), procedure-related information (e.g., procedure name, operator, location, and the like), ECG trace (e.g., ECG data as described above), measurement annotations (e.g., any measurements taken directly on the image e.g., diameter, a value of thickness of a heart wall and the like), image sequence information (e.g., image number, total number of frames, and the like), comments or notes, hospital or clinic information, and/or the like. As an ordinary person skilled in the art, upon reviewing the entirety of this disclosure, will be aware of ICE image 200 and various components thereof may be incorporated by apparatus 100 for generating 3D model of cardiac anatomy.

Figure 3:
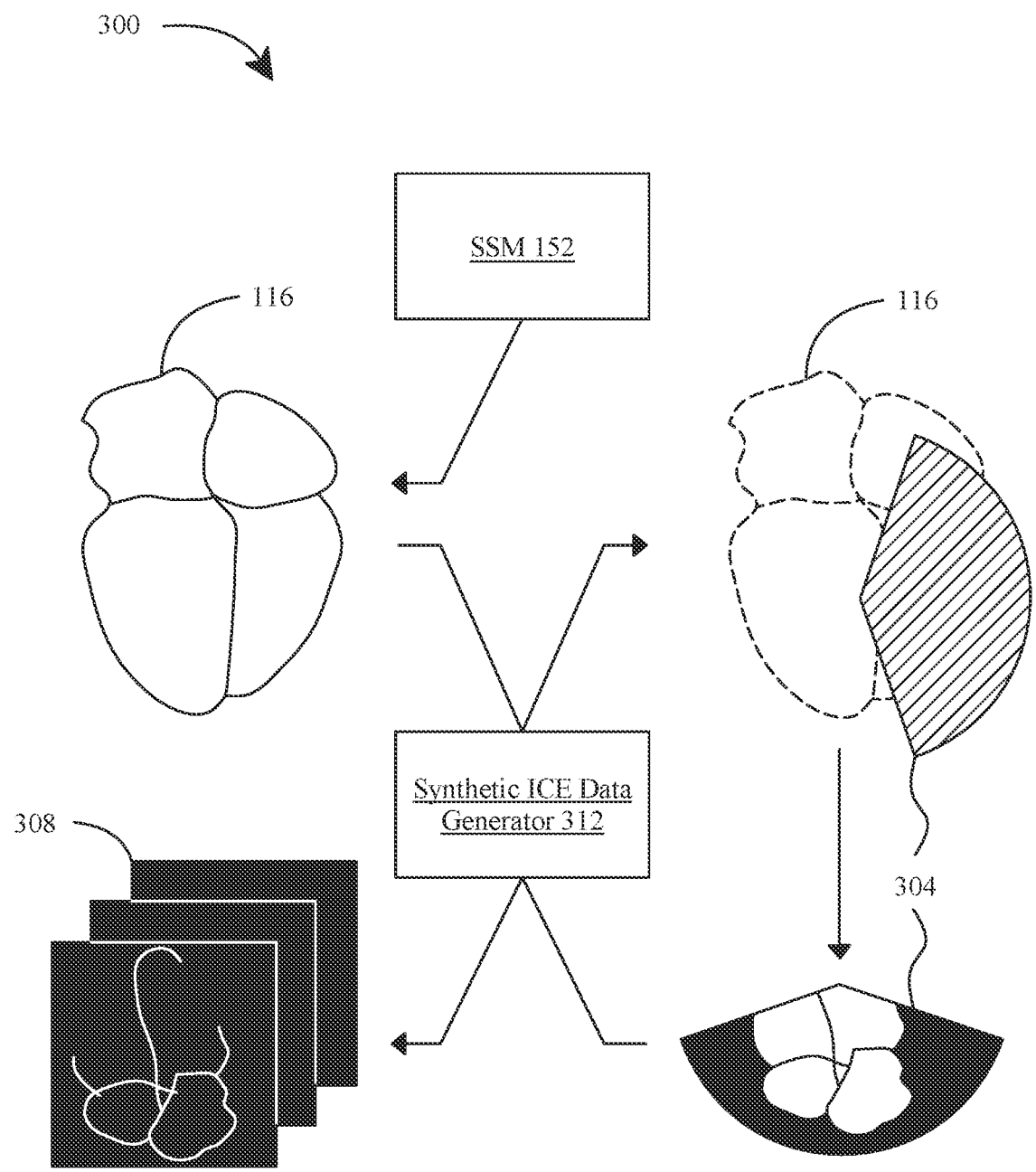
FIG. 3 is a flow diagram of an exemplary embodiment of an ICE image example generation process.

Now referring to FIG. 3, a flow diagram of an exemplary embodiment of an ICE example generation process 300. In an embodiment, cardiac anatomy training data may be generated, at least in part, via ICE example generation process 300. In some cases, processor 104 may be configured to receive a 3D model of the heart, such as any 3D model of cardiac anatomy 116 as described herein and identify an ICE view 304 (i.e., visual representation of image obtained using intracardiac echocardiography as described above e.g., ICE image 200) based on the received 3D model. In some cases, 3D model received by processor 104 may be derived from CT scans as described above with reference to FIG. 1. In other cases, processor may receive CT scans directly instead of 3D models. A synthetic ICE frame 308 may then be generated, by processor 104, as a function of identified ICE view 304, wherein the synthetic ICE frame 208 may be used as one or the training examples in cardiac anatomy training data.

With continued reference to FIG. 3, in some cases, processor 104 may interface with one or more 3D models (i.e., detailed representation of heart's anatomy in a 3D space, capturing intricate structures, chambers, vessels, valves, among others) as described above, or other imaging modalities and/or databases, and equipped with algorithms e.g., CNN, gradient boosting machines, SVM, PCA, and/or the like to analyze model's geometry and spatial relationships upon receiving the 3D models. In some cases, 3D models may be received from SSM 152 as described above with reference to FIG. 1 via a communicative connection between processor 104 and SSM 152. In a non-limiting example, processor 104 may be configured to determine an optimal viewpoints or angles from which ICE view 304 would provide a desired diagnostic value or procedural guidance.

Still referring to FIG. 3, in some cases, identification and selection of ICE view 304 may be automatically identified, using one or more machine learning models as described herein. In a non-limiting example, processor 104 may utilize one or more machine learning models trained on cardiac anatomy viewpoints identification training data, wherein the cardiac anatomy viewpoints identification training data may include a plurality of cardiac anatomies as input correlated to a plurality of ICE images as output and identify at least one ICE view 304 (most informative) for a given cardiac anatomy using the trained machine learning models.

Still referring to FIG. 3, in other cases, ICE view 304 may be defined by a user such as a medical professional. In a non-limiting example user interface 172 of display device 168 may allow a user (e.g., a clinician) to manually rotate, pan, and zoom displayed 3D model and/or corresponding CT scans. As user do so, processor 104 may dynamically calculate and displays potential ICE views 304 based on user's chosen perspective. Additionally, or alternatively, depending on cardiac procedure being planned or executed, processor 104 may prioritize certain ICE views 304. For instance, and without limitation, ICE view 304 may be pre-defined. For atrial fibrillation ablation, ICE view 304 may showcase the pulmonary veins' entrances into the LA may be emphasized. In other cases, ICE view 304 may be automatically identified, by processor 104, using one or more machine learning models as described herein, such as, without limitation, synthetic ICE data generator as described in detail below.

With continued reference to FIG. 3, as used in this disclosure, a "synthetic ICE frame" refers to a digitally generated or simulated image that emulates a visual representation obtained from an ICE view. In some cases, synthetic ICE frames 308 may be produced using computational methods and/or models such as, without limitation, a synthetic ICE data generator 312 based on pre-existing data, models, or simulations e.g., identified ICE views 304. In a non-limiting example, synthetic ICE frames 308 may include a simplified version e.g., an image illustrating heart anatomy via a plurality of lines indicating contours of heart's structure as shown in FIG. 3. One or more image processing techniques and/or computer vision algorithms such as, without limitation, histogram equalization, adaptive filtering, edge detection (e.g., Canny or Sobel operators), contour extraction, and/or the like may be applied, by processor 104, on a segmented CT scan and/or 3D models based on identified ICE view 304. Synthetic ICE frame 308 may be rendered on a blank canvas or background that mimics the echogenicity of an ICE image according to extracted contours, wherein the extracted contours may be represented as a bold lines and enhanced with shading to give depth. In some cases, synthetic ICE frame 308 may be validated and verified by overlaying synthetic ICE frame 308 onto original ICE view 304, ensuring accuracy and resemblance.

Still referring to FIG. 3, in some cases, generating synthetic ICE frames 308 may include implementations of one or more aspects of "generative artificial intelligence (AI)," a type of AI that uses machine learning algorithms to create, establish, or otherwise generate data such as, without limitation, ICE images, ICE videos, and the like that is similar to one or more provided training examples. In an embodiment, machine learning module described herein may generate one or more generative machine learning models that are trained on one or more set of CT scans and/or 3D models in ICE image view 304 as described above. Synthetic ICE data generator 312 may include one or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

Still referring to FIG. 3, in some cases, generative machine learning models within synthetic ICE data generator may include one or more generative models. As described herein, a "generative model" is a statistical model of the joint probability distribution $P(X, Y)$ on a given observable variable x, representing features, data, or both that can be directly measured or observed and target variable y, representing the outcomes, labels, or both that one or more generative models aims to predict, generate, or both. A feature and/or data that can be directly measured or observed may include, in non-limiting examples, CT scans and/or 3D models derived from CT scans. An outcome and/or label that one or more generative models aims to predict and/or generate may include, in a non-limiting example, synthetic ICE frames 308. In some cases, generative models may rely on Bayes theorem to find joint probability; for instance, and without limitation, Naïve Bayes classifiers may be employed by computing device to categorize input data such as, without limitation, CT scans and/or 3D models derived from CT scans into different views.

In a non-limiting example, and still referring to FIG. 3, one or more generative machine learning models may include one or more Naïve Bayes classifiers generated, by processor 104, using a Naïve bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction.

Still referring to FIG. 3, although Naïve Bayes classifier may be primarily known as a probabilistic classification algorithm; however, it may also be considered a generative model described herein due to its capability of modeling the joint probability distribution $P(X, Y)$ over observable variables X and target variable Y. In an embodiment, Naïve Bayes classifier may be configured to make an assumption that the features X are conditionally independent given class label Y, allowing generative model to estimate the joint distribution as $P(X, Y)=P(Y)\Pi_i P(X_i|Y)$, wherein $P(Y)$ may be the prior probability of the class, and $P(X_i|(Y)$ is the conditional probability of each feature given the class. One or more generative machine learning models containing Naïve Bayes classifiers may be trained on labeled training data, estimating conditional probabilities $P(X_i|Y)$ and prior probabilities $P(Y)$ for each class; for instance, and without limitation, using techniques such as Maximum Likelihood Estimation (MLE). One or more generative machine learning models containing Naïve Bayes classifiers may select a class label y according to prior distribution $P(Y)$, and for each feature $X_i$, sample at least a value according to conditional distribution $P(X_i|y)$. Sampled feature values may then be combined to form one or more new data instance with selected class label y. In a non-limiting example, one or more generative machine learning models may include one or more Naïve Bayes classifiers to generate new examples of ICE images based on CT scans and/or 3D models derived from CT scans (e.g., identified ICE views 304), wherein the models may be trained using training data containing a plurality of features of input data as described herein and/or the like correlated to a plurality of ICE views.

Still referring to FIG. 3, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIGS. 5-7.

With continued reference to FIG. 3, in an embodiment, discriminator may include one or more discriminative models, i.e., models of conditional probability P(Y|X=x) of target variable Y, given observed variable X. In an embodiment, discriminative models may learn boundaries between classes or labels in given training data. In a non-limiting example, discriminator may include one or more classifiers as described in further detail below with reference to FIG. 5 to distinguish between different categories e.g., real vs. fake, or states e.g., TRUE vs. FALSE within the context of generated data such as, without limitations, synthetic ICE frames 308, and/or the like. In some cases, processor 104 may implement one or more classification algorithms such as, without limitation, Support Vector Machines (SVM), Logistic Regression, Decision Trees, and/or the like to define decision boundaries.

In a non-limiting example, and still referring to FIG. 3, generator of GAN may be responsible for creating synthetic data that resembles real ICE images. In some cases, GAN may be configured to receive CT scans and/or 3D models derived from CT scans as input and generates corresponding examples of ICE images containing information describing heart anatomy in different ICE views. On the other hand, discriminator of GAN may evaluate the authenticity of the generated content by comparing it to true ICE images, for example, discriminator may distinguish between genuine and generated content and providing feedback to generator to improve the model performance. Additionally, or alternatively, GAN may include a conditional GAN as an extension of the basic GAN as described herein that allows for generation of ICE images using pre-existing CT scans and/or 3D models derived from CT scans based on certain conditions or labels. In standard GAN, generator may produce samples from random noise, while in a conditional GAN, generator may produce samples based on random noise and a given condition or label.

With continued reference to FIG. 3, in other embodiments, one or more generative models may also include a variational autoencoder (VAE). As used in this disclosure, a "variational autoencoder" is an autoencoder (i.e., an artificial neural network architecture) whose encoding distribution is regularized during the model training process in order to ensure that its latent space includes desired properties allowing new data sample generation. In an embodiment, VAE may include a prior and noise distribution respectively, trained using expectation-maximization meta-algorithms such as, without limitation, probabilistic PCA, sparse coding, among others. In a non-limiting example, VEA may use a neural network as an amortized approach to jointly optimize across input data and output a plurality of parameters for corresponding variational distribution as it maps from a known input space to a low-dimensional latent space. Additionally, or alternatively, VAE may include a second neural network, for example, and without limitation, a decoder, wherein the "decoder" is configured to map from the latent space to the input space.

In a non-limiting example, and still referring to FIG. 3, VAE may be used by processor 104 to model complex relationships between CT scans and/or 3D models derived from CT scans. In some cases, VAE may encode input data into a latent space, capturing example ICE images. Such encoding process may include learning one or more probabilistic mappings from observed CT scans and/or 3D models derived from CT scans to a lower-dimensional latent representation. Latent representation may then be decoded back into the original data space, therefore reconstructing the 3D models representing example ICE images. In some cases, such decoding process may allow VAE to generate new examples or variations that are consistent with the learned distributions.

Additionally, or alternatively, and still referring to FIG. 3, processor 104 may be configured to continuously monitor synthetic ICE data generator. In an embodiment, processor 104 may configure discriminator to provide ongoing feedback and further corrections as needed to subsequent input data. An iterative feedback loop may be created as processor 104 continuously receive real-time data, identify errors (e.g., distance between synthetic ICE frame 308 and real ICE images) as a function of real-time data, delivering corrections based on the identified errors, and monitoring subsequent model outputs and/or user feedbacks on the delivered corrections. In an embodiment, processor 104 may be configured to retrain one or more generative machine learning models within synthetic ICE data generator based on user modified ICE frames or update training data of one or more generative machine learning models within synthetic ICE data generator by integrating validated synthetic ICE frames (i.e., subsequent model output) into the original training data. In such embodiment, iterative feedback loop may allow synthetic ICE data generator to adapt to the user's needs and performance requirements, enabling one or more generative machine learning models described herein to learn and update based on user responses and generated feedbacks.

With continued reference to FIG. 3, other exemplary embodiments of generative machine learning models may include, without limitation, long short-term memory networks (LSTMs), (generative pre-trained) transformer (GPT) models, mixture density networks (MDN), and/or the like. As an ordinary person skilled in the art, upon reviewing the entirety of this disclosure, will be aware of various generative machine learning models that may be used generating synthetic ICE frames 308.

Still referring to FIG. 3, in a further non-limiting embodiment, synthetic ICE data generator 312 may be further configured to generate a multi-model neural network that combines various neural network architectures described herein. In a non-limiting example, multi-model neural network may combine LSTM for time-series analysis with GPT models for natural language processing. Such fusion may be applied by computing device to generate synthetic ICE frames 308. In some cases, multi-model neural network may also include a hierarchical multi-model neural network, wherein the hierarchical multi-model neural network may involve a plurality of layers of integration; for instance, and without limitation, different models may be combined at various stages of the network. Convolutional neural network (CNN) may be used for image feature extraction, followed by LSTMs for sequential pattern recognition, and a MDN at the end for probabilistic modeling. Other exemplary embodiments of multi-model neural network may include, without limitation, ensemble-based multi-model neural network, cross-modal fusion, adaptive multi-model network, among others. As an ordinary person skilled in the art, upon reviewing the entirety of this disclosure, will be aware of various generative machine learning models that may be used to generating synthetic ICE frames 308 as described herein. As an ordinary person skilled in the art, upon reviewing the entirety of this disclosure, will be aware of various multi-model neural network and combination thereof that may be implemented by apparatus 100 in consistent with this disclosure.

Figure 4:
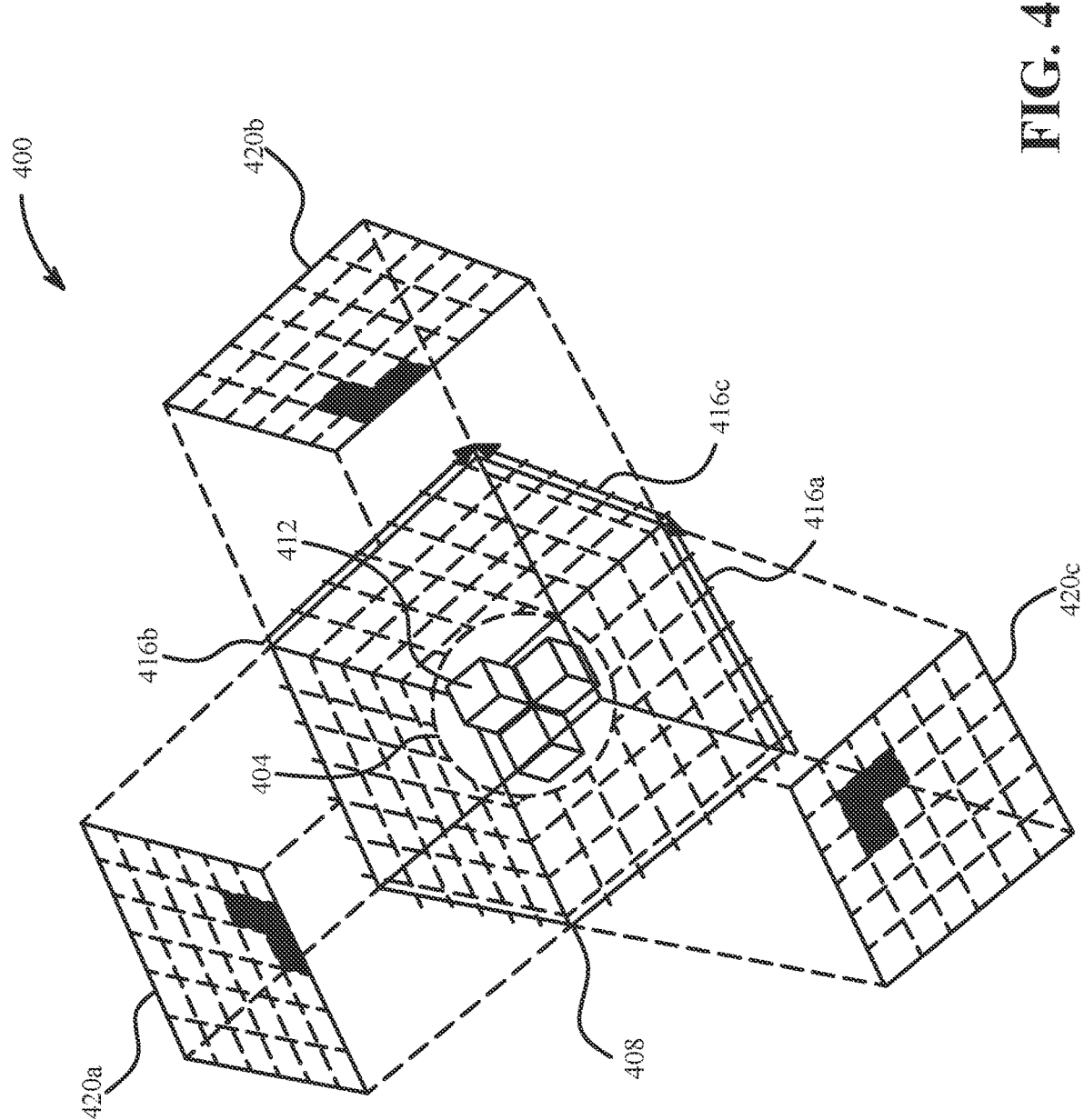
FIG. 4 illustrates an exemplary embodiment of a three-dimensional (3D) voxel occupancy representation.

Now referring to FIG. 4, an exemplary embodiment of a 3D VOR 400 is illustrated. 3D VOR 400 may be used to represent 3D object 404. In an embodiment, 3D VOR 400 may divide a 3D space 408 into a grid of one or more cubic units e.g., voxels 412, wherein each voxel 412 represents a specific volume within 3D space 408. In a non-limiting example, 3D object 404 may include a cardiac anatomy pertaining to a subject.

Still referring to FIG. 4, in some cases, each voxel 412 may act as a basic building block. In a non-limiting example, each voxel 412 may be configured to represent a discrete portion of 3D space 408. In an embodiment, each voxel 412 may include a presence indicator as described above with reference to FIG. 1, which denotes whether the voxel is occupied or unoccupied. In such embodiment, the binary or continuous value may allow 3D VOR 400 to map the presence or absence of material within each voxel 412, creating a granular representation of 3D object 404.

With continued reference to FIG. 4, in some cases, the resolution of 3D VOR 400 may be determined by the size and number of voxels within the grid. In a non-limiting example, smaller voxel may provide a higher resolution, capturing finer details, while larger voxels offer a more generalized representation.

Still referring to FIG. 4, in an embodiment, voxels 412 may be arranged in a regular pattern along three axis 416*a-b*, each pointing a distinct direction. In a non-limiting example, voxels 412 may be arranged along x, y, and z axes, wherein such arrange may facilitate efficient manipulation and rendering of the 3D object 404. In some cases, spatial features 420*a-c* such as, without limitation, edges, surfaces, textures, and any other spatial features as described above with reference to FIG. 1, may be extracted from 3D VOR 400 by analyzing the relationships and patterns between neighboring voxels.

Figure 5:
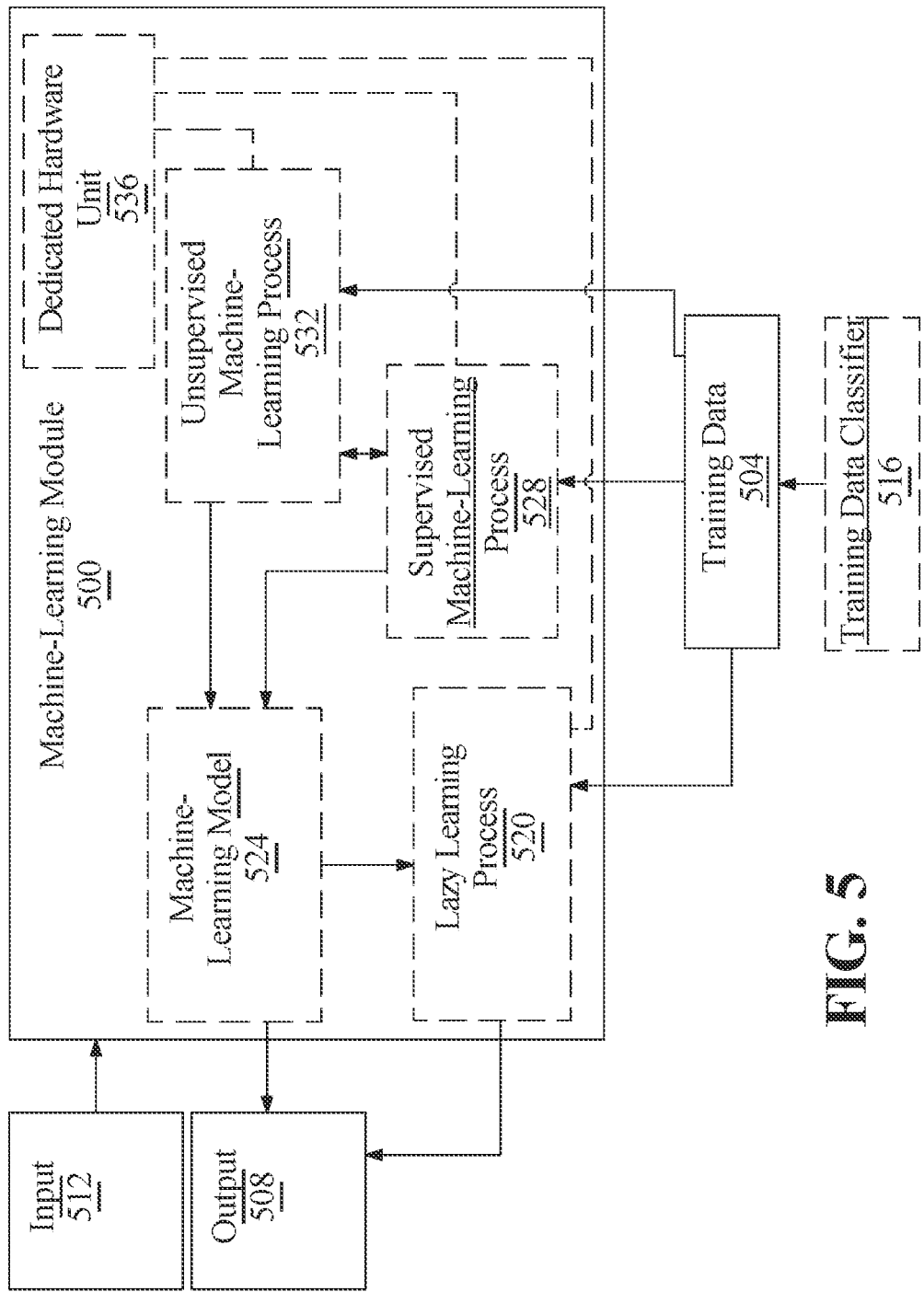
FIG. 5 is a block diagram of an exemplary machine-learning process.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example, image sets may be correlated with plurality of CT-based cardiac anatomy models as training data that may be used to train cardiac anatomy modeling machine learning model as described above with reference to FIG. 1.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to at least one template model of plurality of template modules as described above with reference to FIG. 1.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be. Processor may interpolate the low pixel count image to convert the 100 pixels into pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be. Processor may down-sample the high pixel count image to convert the 256 pixels into pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include a plurality of image sets as described above as inputs, a plurality of shape parameter sets as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
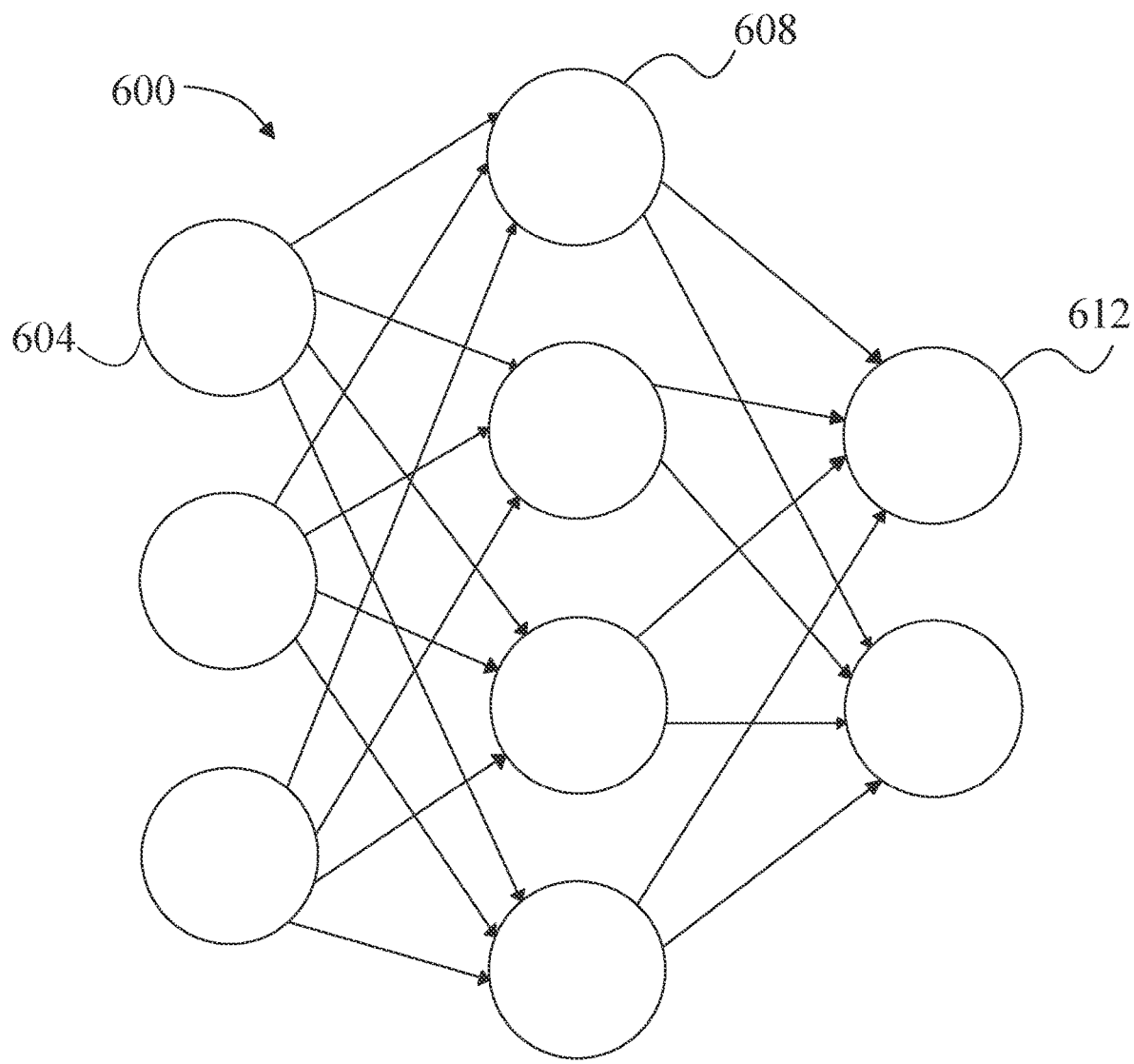
FIG. 6 is a diagram of an exemplary embodiment of a neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training data set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
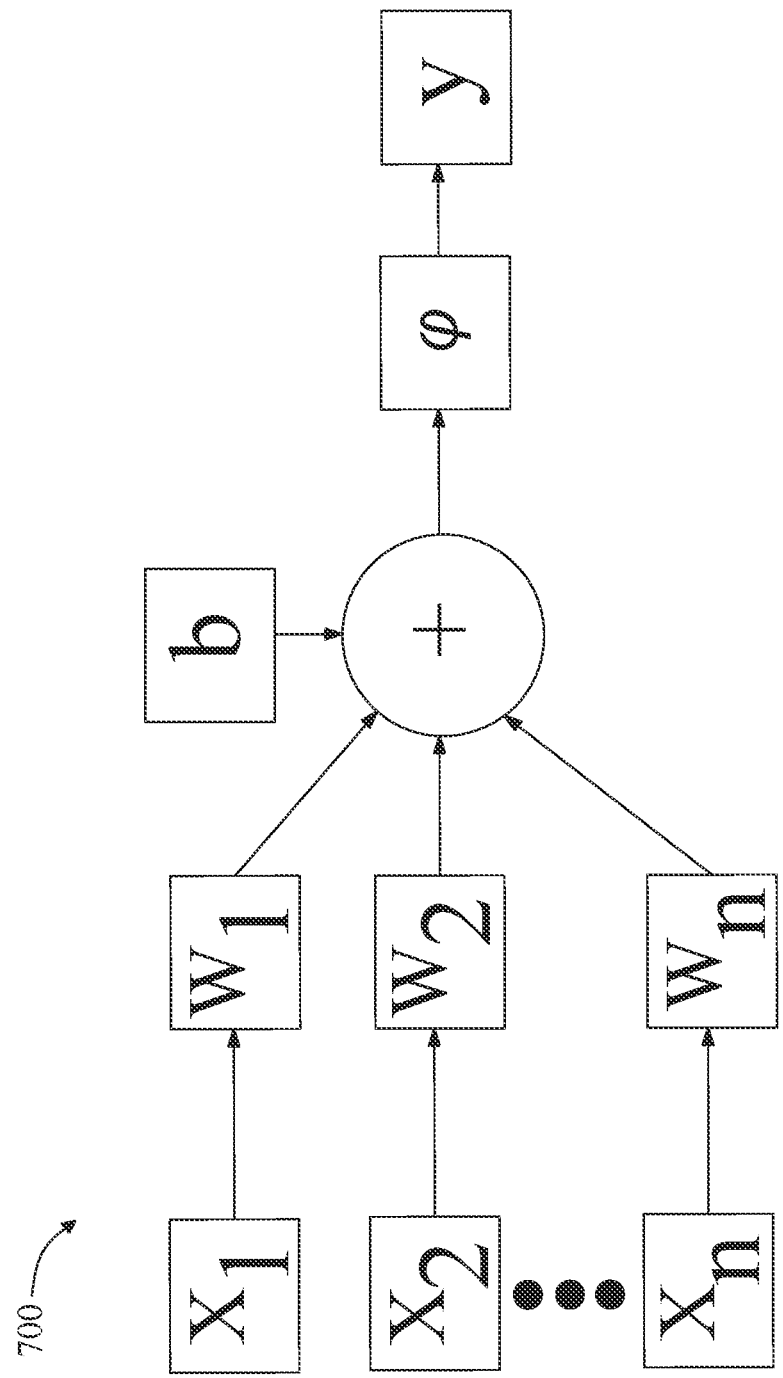
FIG. 7 is a diagram of an exemplary embodiment of a node of a neural network.

Referring now to FIG. 7, an exemplary embodiment of a node 700 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(\alpha x, x)$ for some $\alpha$, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
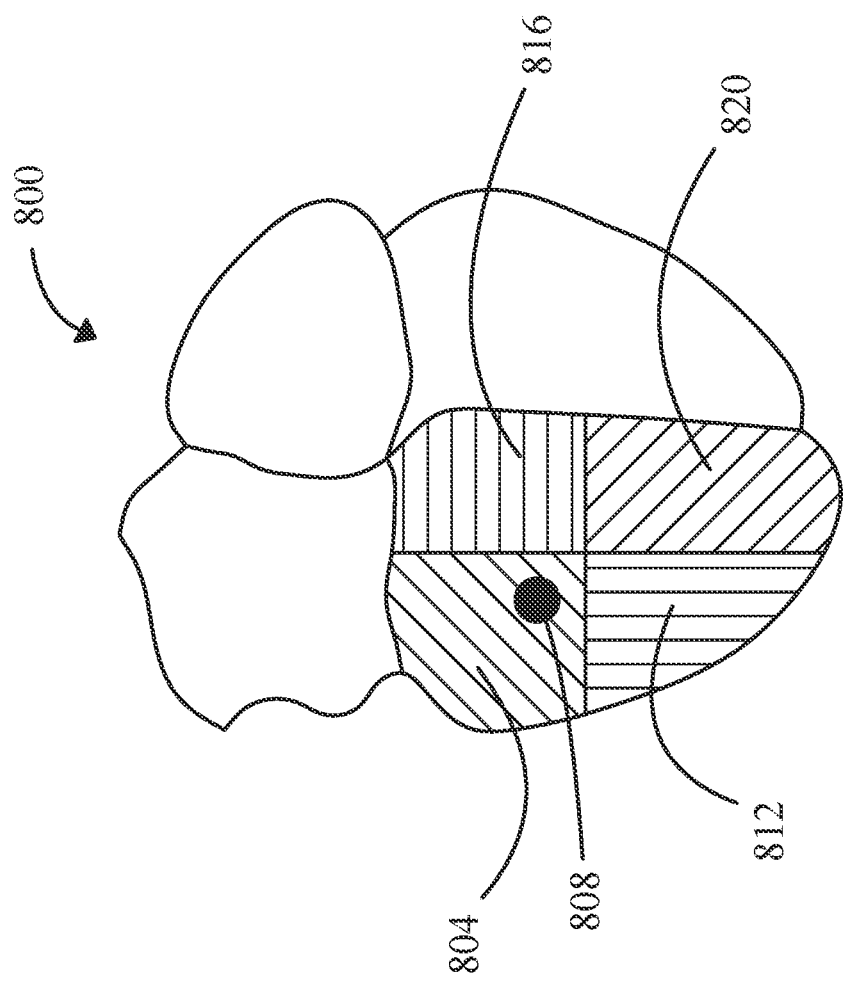
FIG. 8 is a diagram illustrating an exemplary embodiment of an overlaid heat map.

Now referring to FIG. 8, an exemplary embodiment of an overlaid heat map 800 is illustrated. Heat map 800 may include elements described with reference to other figures and/or may be generated as described with reference to other figures. Heat map 800 may illustrate one or more of levels of uncertainty differentiated by color, shading, texture, and the like as described above. For example, heat map 800 may depict a first level of uncertainty 804. In some embodiments, first level of uncertainty 804 may be determined as a function of a level of uncertainty associated with one or more points within a region associated with first level of uncertainty, such as point 808. In some embodiments, heat map 800 may depict one or more additional levels of uncertainty, such as second level of uncertainty 812, third level of uncertainty 816, and/or fourth level of uncertainty 820. In some embodiments, levels of uncertainty may be displayed as discrete regions and/or discrete levels of uncertainty. This may make heat map 800 more readable for a user than an alternative in which continuous levels of uncertainty are displayed. In some embodiments, levels of uncertainty may be displayed on a continuous scale. For example, each point on heat map 800 may have a color associated with its level of uncertainty. This may improve accuracy of depictions of uncertainty at specific locations. In some embodiments, one or more levels of uncertainty may represent a certain percentage of certainty and/or accuracy, in the depiction of a shape parameter, location, geometric identifier and the like. In some embodiments, map 800 may depict levels of uncertainty relative to other levels of uncertainty of map 800. For example, if first level of uncertainty 804 is the highest level of uncertainty of map 800, and second level of uncertainty 812 is the lowest level of uncertainty of map 800, then third level of uncertainty 816 and/or fourth level of uncertainty 820 may have values, colors, patterns, levels of transparencies, and the like associated with how close to the minimum and maximum levels of uncertainty they are. In some embodiments, each level of uncertainty may be measured on an absolute scale. For example, first level of uncertainty 804 may have a value, color, pattern, level of transparency, and the like associated with a percent likelihood that a 3D model at first level of uncertainty 804 is correct. In some embodiments, each level of uncertainty may be scaled based on color code/texture code based scales as described above. For example, first level of uncertainty 804 may include a light shading of an area of the heart model, wherein as the level of uncertainty progress, shading darkens in second level of uncertainty 812.

Figure 9:
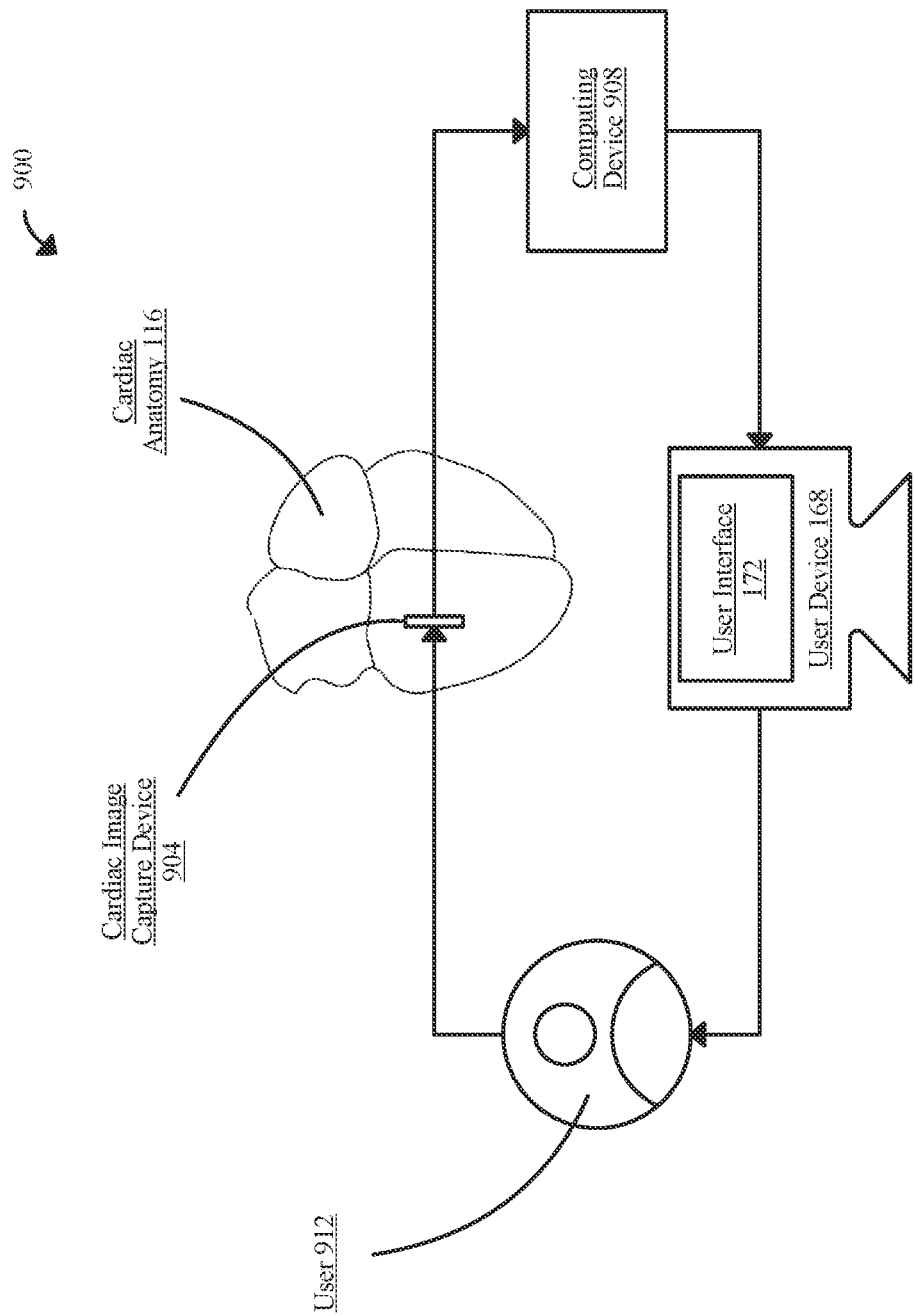
FIG. 9 is a diagram depicting an exemplary method of generating a three-dimensional (3D) model of cardiac anatomy.

Referring now to FIG. 9, an exemplary system 900 for generating a three-dimensional (3D) model of cardiac anatomy is illustrated. System 900 may include cardiac image capture device 904. Cardiac image capture device 904 may include a cardiac image capture device described with reference to another figure herein. For example, cardiac image capture device 904 may include an ICE catheter. System 900 may further include computing device 908. Computing device may receive a first set of images, such as a first set of ICE images, from cardiac image capture device 904. Computing device 908 may perform one or more processing steps described herein, such as application of a shape identification model to generate a set of shape parameters, application of a statistical shape model to generate a 3D model, determination of a level of uncertainty and/or a map, overlay of a map onto a 3D model, and/or display of a map and/or a 3D model to a user using user interface 172 and/or user device 168. User 912 may receive information, such as information as to a level of uncertainty at a particular location of a 3D model and/or cardiac anatomy 116 and may position cardiac image capture device 904 within cardiac anatomy 116 in order to capture a second set of images, such as a second set of ICE images. User 912 may perform this through, for example, interaction with user interface 172. Second set of images may be used to generate an updated 3D model, an updated map, and/or an updated level of uncertainty, which may be displayed to user 912 through user interface 172.

Figure 10:
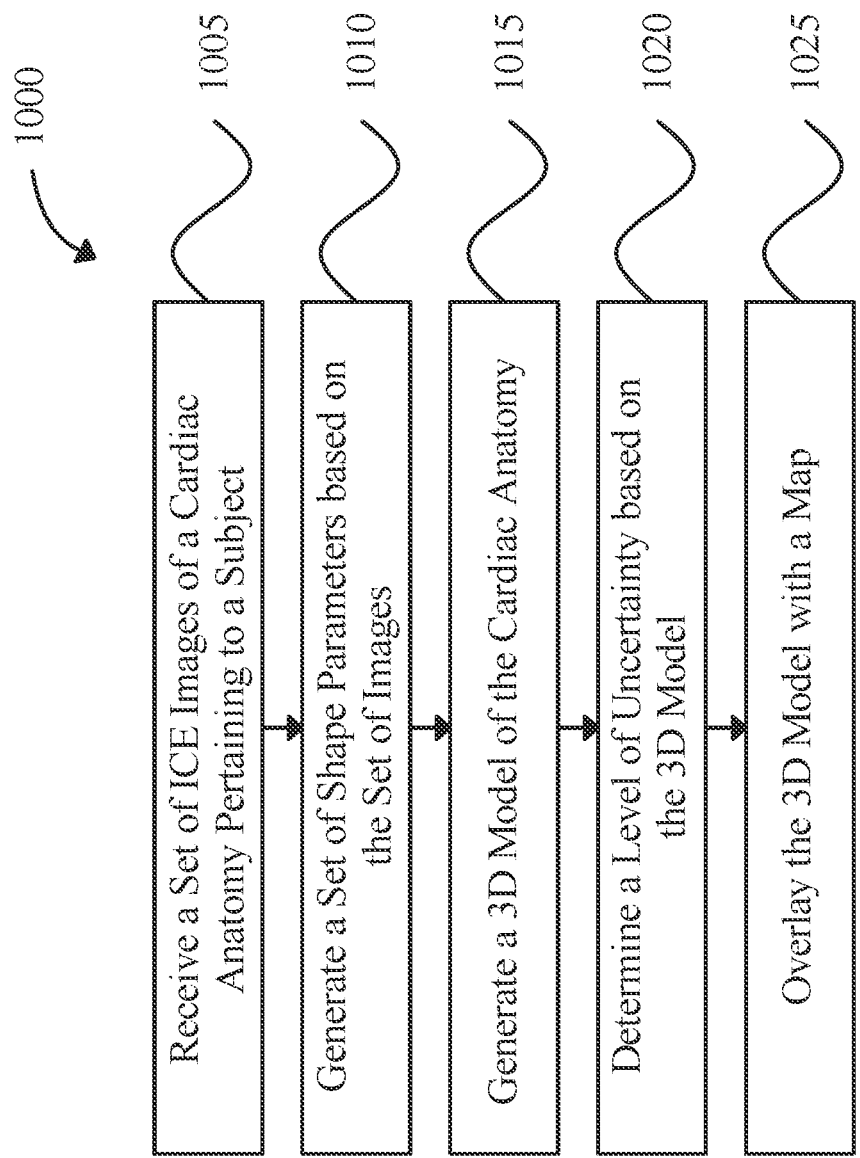
FIG. 10 is a flow diagram illustrating an exemplary embodiment of a method for generating a three-dimensional (3D) model of cardiac anatomy with an overlay.

Referring now to FIG. 10, a flow diagram illustrating an exemplary embodiment of a method 1000 for generating a three-dimensional (3D) model of cardiac anatomy with an overlay is illustrated. At step 1005, method 1000 includes receiving, by a processor, a set of images of a cardiac anatomy pertaining to a subject. This may be implemented as disclosed above and with reference to FIGS. 1-8. At step 1010, method 1000 includes generating, by the processor, a set of shape parameters based on the set of images, wherein generating the set of shape parameters comprises receiving cardiac geometry training data comprising a plurality of image sets as input correlated to a plurality of shape parameter sets as output, training a shape identification model using the cardiac geometry training data, and generating the set of shape parameters using the shape identification model. This may be implemented as disclosed above and with reference to FIGS. 1-8. At step 1015, method 1000 includes generating, by the processor, a 3D model of the cardiac anatomy based on the set of shape parameters. This may be implemented as disclosed above and with reference to FIGS. 1-8. At step 1020, method 1000 includes generating, by the processor, a map by determining a level of uncertainty at each location of a plurality of locations on the generated 3D model. This may be implemented as disclosed above and with reference to FIGS. 1-8. At step 1035, method 1000 includes overlaying, by the processor, the 3D model with the map.

Figure 11:
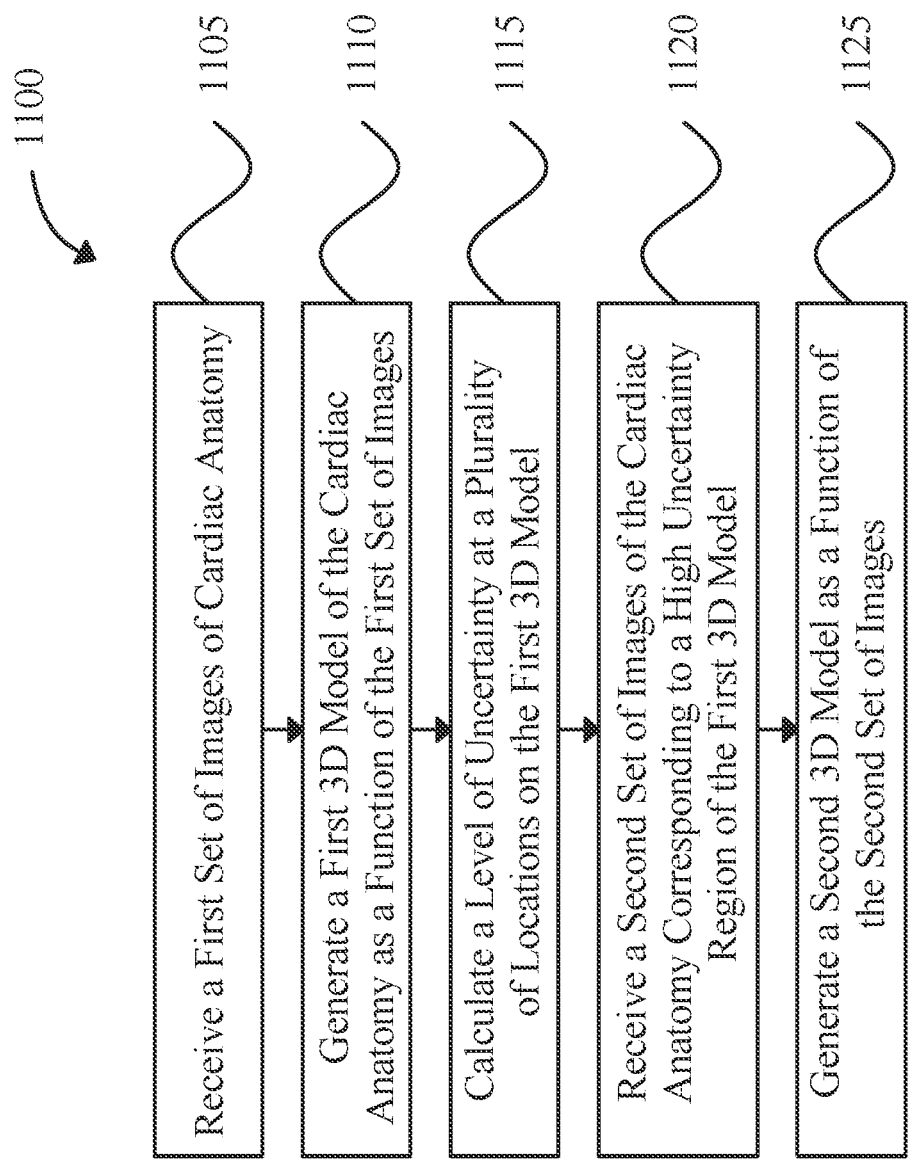
FIG. 11 is an illustration of an exemplary system for generating a three-dimensional (3D) model of cardiac anatomy.

Referring now to FIG. 11, an exemplary embodiment of a method 1100 of generating a three-dimensional (3D) model of cardiac anatomy is illustrated. One or more steps if method 1100 may be implemented, without limitation, as described with reference to other figures. One or more steps of method 1100 may be implemented, without limitation, using at least a processor.

Still referring to FIG. 11, in some embodiments, method 1100 may include receiving a first set of images of cardiac anatomy 1105. In some embodiments, capturing a second set of images may include using a display device, displaying the first 3D model of the cardiac anatomy to a user; and by the user, positioning the cardiac image capture device for capturing an image of the low confidence region. In some embodiments, displaying the first 3D model of the cardiac anatomy to the user may include generating a first map by determining a level of uncertainty at each location of a plurality of locations on the generated first 3D model; and overlaying the first map onto the first 3D model. In some embodiments, the first map identifies the high uncertainty region of the first 3D model. In some embodiments, the first map comprises a color-coded heat map configured to visualize one or more areas of uncertainty on the first 3D model. In some embodiments, the cardiac image capture device comprises an intracardiac echocardiography catheter.

Still referring to FIG. 11, in some embodiments, method 1100 may include generating a first 3D model of the cardiac anatomy as a function of the first set of images 1110. In some embodiments, generating the first 3D model includes generating a set of shape parameters based on the first set of images; generating the set of shape parameters includes receiving cardiac geometry training data comprising a plurality of image sets as inputs correlated to a plurality of shape parameter sets as outputs; training a shape identification model using the cardiac geometry training data; and generating the set of shape parameters using the shape identification model; and the first 3D model is generated based on the set of shape parameters. In some embodiments, the high uncertainty region is determined using model output uncertainty. In some embodiments, the plurality of shape parameter sets of the cardiac geometry training data is generated using computed tomography. In some embodiments, the shape identification model includes a deep neural network. In some embodiments, the shape identification model includes a convolutional neural network. In some embodiments, the second 3D model is generated using the shape identification model and the second set of images. In some embodiments, the second 3D model is generated using the first set of images. In some embodiments, generating the first 3D model further comprises using a statistical shape model to generate the first 3D model as a function of the set of shape parameters. In some embodiments, the set of shape parameters includes a plurality of numerical descriptors, wherein each numerical descriptor of the plurality of numerical descriptors represents a geometric characteristic of the cardiac anatomy. In some embodiments, each shape parameter within the set of shape parameters includes a corresponding parameter range.

Still referring to FIG. 11, in some embodiments, method 1100 may include calculating a level of uncertainty at each location of a plurality of locations on the first 3D model 1115.

Still referring to FIG. 11, in some embodiments, method 1100 may include receiving a second set of images of the cardiac anatomy corresponding to a high uncertainty region of the first 3D model 1120.

Still referring to FIG. 11, in some embodiments, method 1100 may include generating a second 3D model as a function of the second set of images 1125.

Still referring to FIG. 11, in some embodiments, method 1100 may further include displaying the second 3D model to a user. In some embodiments, displaying the second 3D model of the cardiac anatomy to the user includes generating a second map by determining a level of uncertainty at each location of a plurality of locations on the generated second 3D model; and overlaying the second map onto the second 3D model. In some embodiments, the second map comprises a color-coded heat map configured to visualize one or more areas of uncertainty on the second 3D model.

Still referring to FIG. 11, in some embodiments, method 1100 may be performed using a plurality of cardiac image capture devices. For example, a first set of images may be captured using a first cardiac image capture device and a second set of images may be captured using a second cardiac image capture device.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
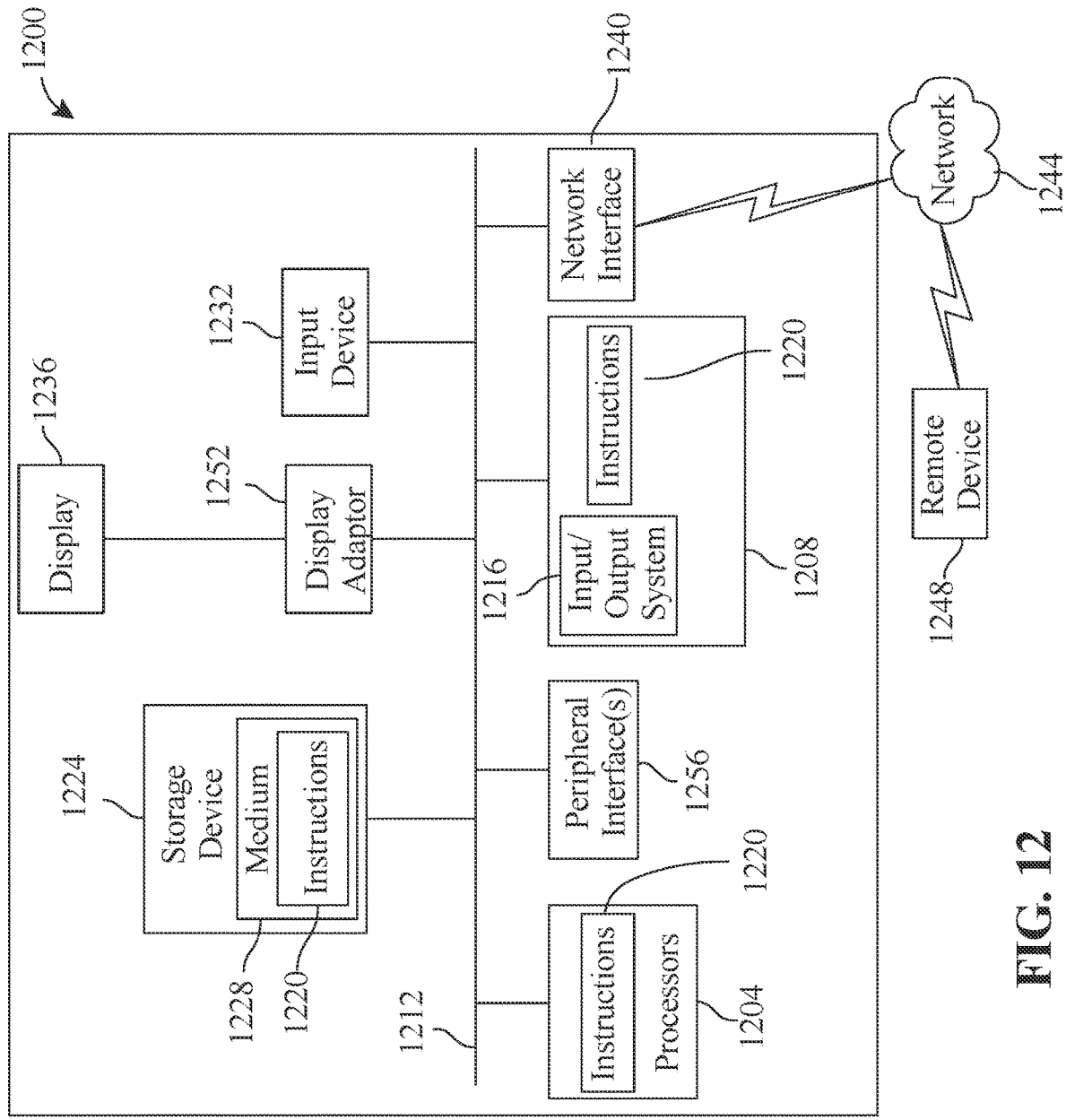
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 13104 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A method of generating a three-dimensional (3D) model of cardiac anatomy, the method comprising:
   using at least a processor, receiving a first set of ultrasound images of cardiac anatomy;
   using at least a processor, generating a first 3D model of the cardiac anatomy by:
      inputting into at least a trained neural network the first set of ultrasound images of cardiac anatomy;
      receiving as an output from the at least a trained neural network a first set of shape parameters; and
      using a statistical shape model to determine the first 3D model of the cardiac anatomy as a function of the set of shape parameters;
   using at least a processor, calculating a level of uncertainty at a plurality of locations on the first 3D model;
   using at least a processor, receiving a second set of ultrasound images of the cardiac anatomy corresponding to a high uncertainty region of the first 3D model, wherein receiving the second set of ultrasound images comprises, by a user, positioning for capturing an image of the high uncertainty region a cardiac image capture device configured to capture ultrasound images; and using at least a processor, generating a second 3D model by:

inputting into the at least a trained neural network the first set of ultrasound images of cardiac anatomy and the second set of ultrasound images of cardiac anatomy;

receiving as an output from the at least a trained neural network a second set of shape parameters; and using the statistical shape model to determine the second 3D model of the cardiac anatomy as a function of the second set of shape parameters.

2. The method of claim 1, wherein receiving a second set of ultrasound images comprises, using a display device, displaying the first 3D model of the cardiac anatomy to a user.

3. The method of claim 1, wherein displaying the first 3D model of the cardiac anatomy to the user comprises:

using a display device, displaying the first 3D model of the cardiac anatomy to a user;

generating a first map comprising a level of uncertainty at each location of a plurality of locations on the generated first 3D model; and overlaying the first map onto the first 3D model.

4. The method of claim 3, wherein the first map identifies the high uncertainty region of the first 3D model.

5. The method of claim 3, wherein the first map comprises a color-coded heat map configured to visualize one or more areas of uncertainty on the first 3D model.

6. The method of claim 1, wherein receiving a second set of ultrasound images comprises capturing a second set of ultrasound images using the cardiac image capture device, wherein the cardiac image capture device comprises an intracardiac echocardiography catheter.

7. The method of claim 1, wherein the method further comprises removing an image of the first set of ultrasound images from the first set of ultrasound images.

8. The method of claim 1, wherein the method further comprises duplicating an image of the first set of ultrasound images and adding the duplicate to the first set of ultrasound images.

9. The method of claim 1, wherein the method further comprises:

receiving cardiac geometry training data comprising a plurality of image sets as inputs correlated to a plurality of shape parameter sets as outputs; and training a shape identification model using the cardiac geometry training data.

10. The method of claim 9, wherein the plurality of shape parameter sets of the cardiac geometry training data is generated using computed tomography.

11. The method of claim 1, wherein the high uncertainty region is determined using model output uncertainty.

12. The method of claim 1, wherein the at least a trained neural network comprises a convolutional neural network.

13. The method of claim 1, wherein the set of shape parameters comprises a plurality of numerical descriptors, wherein each numerical descriptor of the plurality of numerical descriptors represents a geometric characteristic of the cardiac anatomy.

14. The method of claim 1, wherein each shape parameter within the set of shape parameters comprises a corresponding parameter range.

15. The method of claim 1, further comprising continuously updating, using the processor, the second 3D model as a function of further sets of ultrasound images.

16. The method of claim 1, further comprising displaying the second 3D model to a user.

17. The method of claim 16, wherein displaying the second 3D model of the cardiac anatomy to the user comprises:

generating a second map by determining a level of uncertainty at each location of a plurality of locations on the generated second 3D model; and overlaying the second map onto the second 3D model.

18. The method of claim 17, wherein the second map comprises a color-coded heat map configured to visualize one or more areas of uncertainty on the second 3D model.

19. The method of claim 1, wherein generating the first 3D model comprises removing a first image of the first set of ultrasound images as a function of a lack of diversity between the first image and a second image of the first set of ultrasound images.

20. The method of claim 1, wherein generating the first 3D model comprises duplicating an image of the first set of ultrasound images and including the duplicate in the first set of ultrasound images such that a number of images of the first set of ultrasound images satisfies an input requirement of the at least a trained neural network.

* * * * *